US012569881B2

(12) United States Patent　　　　(10) Patent No.:　　US 12,569,881 B2
Zemp et al.　　　　　　　　　　　　(45) Date of Patent:　　Mar. 10, 2026

(54) BIAS-SWITCHABLE ULTRASONIC TRANSDUCER ARRAY

(71) Applicants: Roger Zemp, Edmonton (CA); Afshin Kashani Ilkhechi, Edmonton (CA)

(72) Inventors: Roger Zemp, Edmonton (CA); Afshin Kashani Ilkhechi, Edmonton (CA)

( * ) Notice: Subject to any disclaimer, the term of this patent is extended or adjusted under 35 U.S.C. 154(b) by 1054 days.

(21) Appl. No.: 17/471,115

(22) Filed: Sep. 9, 2021

(65) Prior Publication Data

US 2023/0075328 A1　　Mar. 9, 2023

(51) Int. Cl.
　　　*B06B 1/02*　　　　　(2006.01)
　　　*G01S 15/89*　　　　(2006.01)
　　　*G06T 7/00*　　　　　(2017.01)
　　　*G01S 7/52*　　　　　(2006.01)
(52) U.S. Cl.
　　　CPC .......... *B06B 1/0207* (2013.01); *B06B 1/0292* (2013.01); *G01S 15/8915* (2013.01); *G06T 7/0012* (2013.01); *B06B 2201/20* (2013.01); *B06B 2201/51* (2013.01); *B06B 2201/76* (2013.01); *G01S 7/5202* (2013.01); *G01S 7/52025* (2013.01); *G06T 2207/10136* (2013.01)
(58) Field of Classification Search
　　　CPC ....... B06B 1/0207; B06B 1/0292; B06B 1/06; B06B 1/0607; B06B 1/0622
　　　USPC ........................................ 310/322, 334, 335
　　　See application file for complete search history.

(56) References Cited

U.S. PATENT DOCUMENTS

| | | | |
|---|---|---|---|
| 4,425,525 A | * | 1/1984 | Smith ................... B06B 1/0622 |
| | | | 310/334 |
| 4,448,075 A | | 5/1984 | Takemura |
| 4,580,451 A | | 4/1986 | Miwa |
| 4,671,293 A | | 6/1987 | Shaulov |
| 5,027,820 A | | 7/1991 | Pesque |
| 5,152,294 A | | 10/1992 | Mochizuki |

(Continued)

FOREIGN PATENT DOCUMENTS

WO　　　2008/033528 A3　　3/2008

OTHER PUBLICATIONS

Rasmussen, M. F., & Jensen, J. A.; 3-D ultrasound imaging performance of a row-col. addressed 2-D array transducer: A measurement study; IEEE International Ultrasonics Symposium (IUS); 2013, July; pp. 1460-1463.

(Continued)

*Primary Examiner* — Derek J Rosenau
(74) *Attorney, Agent, or Firm* — Nathan V. Woodruff

(57)　　　　　　ABSTRACT

An ultrasonic imaging system has a bias-switchable, ultrasonic transducer array and a bipolar voltage source. The array has a dielectric layer having a top surface and a bottom surface; top and bottom electrode strips in electrical contact with the top and bottom surface of the dielectric layer, the bottom electrode strips being oriented at a non-zero angle relative to the top electrode strips. There is an acoustic matching layer or multiplicity of matching layers on the front-side of the array and a leakage-current mitigation layer. The bipolar voltage source is connected to each of the top and bottom electrode strips to induce a polarization in the dielectric layer, the bipolar voltage source being capable of switching between a high voltage state and a low voltage state. A controller controls the bipolar voltage source, and pulsing to and receiving signals from the top and bottom electrode strips.

31 Claims, 16 Drawing Sheets

(56) References Cited

U.S. PATENT DOCUMENTS

| | | | |
|---|---|---|---|
| 5,327,895 A | 7/1994 | Hashimoto | |
| 5,345,139 A | 9/1994 | Gururaja | |
| 5,410,205 A | 4/1995 | Gururaja | |
| 5,460,179 A | 10/1995 | Okunuki | |
| 5,460,181 A | 10/1995 | Seyed-Bolorforosh | |
| 5,488,956 A | 2/1996 | Bartelt | |
| 5,490,512 A | 2/1996 | Kwon et al. | |
| 5,657,295 A | 8/1997 | Howard | |
| 5,671,746 A | 9/1997 | Dreschel | |
| 5,846,201 A | 12/1998 | Adams | |
| 6,381,197 B1 | 4/2002 | Savord | |
| 6,419,633 B1 | 7/2002 | Robinson | |
| 7,087,023 B2 | 8/2006 | Daft | |
| 7,544,165 B2 | 6/2009 | Mamayek | |
| 7,618,373 B2 | 11/2009 | Ladabaum | |
| 7,780,597 B2 | 8/2010 | Panda | |
| 9,285,466 B2 | 3/2016 | Gomersall | |
| 2005/0043624 A1* | 2/2005 | Oliver | A61B 8/12 |
| | | | 600/459 |
| 2007/0079658 A1 | 4/2007 | Wagner | |
| 2007/0206193 A1 | 9/2007 | Pesach | |
| 2009/0079299 A1 | 3/2009 | Bradley et al. | |
| 2009/0112095 A1 | 4/2009 | Daigle | |
| 2009/0299184 A1 | 12/2009 | Walker et al. | |
| 2010/0239133 A1* | 9/2010 | Schmitt | G06V 40/1306 |
| | | | 310/323.21 |
| 2011/0054292 A1 | 3/2011 | Hirson | |
| 2014/0117809 A1 | 5/2014 | Zemp | |
| 2017/0337682 A1 | 11/2017 | Liao et al. | |
| 2018/0146949 A1* | 5/2018 | Nakamura | A61B 8/54 |
| 2018/0164418 A1 | 6/2018 | Zemp | |
| 2019/0216421 A1 | 7/2019 | Hamilton et al. | |
| 2019/0235077 A1 | 8/2019 | Zemp et al. | |
| 2020/0041644 A1 | 2/2020 | Brown et al. | |
| 2020/0305840 A1 | 10/2020 | Sboros et al. | |
| 2021/0302575 A1* | 9/2021 | Iwama | G01S 7/52001 |

OTHER PUBLICATIONS

Sampaleanu, A., Zhang, P., Kshirsagar, A., Moussa, W., & Zemp, R. J.; Top-orthogonal-to-bottom-electrode (TOBE) CMUT arrays for 3-D ultrasound imaging; IEEE transactions on ultrasonics, ferroelectrics, and frequency control; 2014; 61(2); pp. 266-276.

Wang, Y., Guo, Z., Wang, L. V., Erpelding, T. N., Jankovic, L., Robert, J. L., & David, G .; In vivo three-dimensional photoacoustic imaging based on a clinical matrix array ultrasound probe; Journal of Biomedical Optics; 2012; 17(6); p. 061208.

Ephrat, P., Keenlislide, L., Seabrook, A., Prato, F. S., & Carson, J. J.; Three-dimensional photoacoustic imaging by sparse-array detection and iterative image reconstruction; Journal of Biomedical Optics; 2008; 13(5); p. 054052.

Chee, R. K., Sampaleanu, A., Rishi, D., & Zemp, R. J.; Top orthogonal to bottom electrode (TOBE) 2-D CMUT arrays for 3-D photoacoustic imaging; IEEE transactions on ultrasonics, ferroelectrics, and frequency control; 2014; 61(8); pp. 1393-1395.

C. Ceroici et al., "3D photoacoustic imaging using Hadamard-bias encoding with a crossed electrode relaxor array," Opt. Lett., vol. 43, No. 14, pp. 3425-3428, 2018.

K. Latham, C. Ceroici, C. A. Samson, R. J. Zemp, and J. A. Brown, "Simultaneous azimuth and Fresnel elevation compounding: A fast 3-D imaging technique for crossed-electrode arrays," IEEE Trans. Ultrason., Ferroelectr., Freq. Control, vol. 65, No. 9, pp. 1657-1668, Jun. 2018.

C. Ceroici, T. Harrison, and R. J. Zemp, "Fast orthogonal row-column electronic scanning with top-orthogonal-to-bottom electrode arrays," IEEE Trans. Ultrason., Ferroelectr., Freq. Control, vol. 64, No. 6, pp. 1009-1014, Jun. 2017.

C. Ceroici, K. Latham, B. A. Greenlay, J. A. Brown, and R. J. Zemp, "Fast orthogonal row-column electronic scanning experiments and comparisons," IEEE Trans. Ultrason., Ferroelectr., Freq. Control, vol. 66, No. 6, pp. 1093-1101, Jun. 2019.

C. Ceroici, K. Latham, R. Chee, J. A. Brown, and R. J. Zemp, "Bias-sensitive crossed-electrode relaxor 2D arrays for 3D photoacoustic imaging," Proc. SPIE, vol. 10494, Feb. 2018, Art. No. 1049420.

Seo, Chi Hyung and Jesse T. Yen. "A 256 x 256 2-D array transducer with row-column addressing for 3-D rectilinear imaging." IEEE transactions on ultrasonics, ferroelectrics, and frequency control 56, No. 4 (2009): 837-847.

Novell, Anthony, Mathieu Legros, Jean-Marc Gregoire, Paul A. Dayton, and Ayache Bouakaz. "Evaluation of bias voltage modulation sequence for nonlinear contrast agent imaging using a capacitive micromachined ultrasonic transducer array." Physics in Medicine & Biology 59, No. 17 (2014): 4879.

* cited by examiner

BIAS-SWITCHABLE ULTRASONIC TRANSDUCER ARRAY

TECHNICAL FIELD

This relates to bias-switchable ultrasonic transducer arrays, and in particular the electronics and/or structure of such arrays.

BACKGROUND

Two-dimensional array transducers have enabled 3D ultrasound imaging. With such 2D arrays, there is often an engineering trade-off between system complexity and achievable image quality. Large probes with high-element density would produce high-quality images but with a resulting large number of channels leading to significant interconnect and channel count difficulties. Various old 3D imaging techniques have been implemented by mechanically sweeping a linear or annular transducer, but this generally results in slow volumetric imaging. With respect to image quality from 2D arrays, this may be improved with the use of micro-beamforming, involving pre-amplifiers, analog-to-digital converters, and delay-and-sum circuitry implemented as a custom integrated circuit beneath the shadow of each element.

In micro-beamforming, fine-delays are introduced to elements before summing in groups, and coarse delays are implemented in the mainframe. Micro-beamformers may implement tilt-only fine-delays as a linear approximation to a quadratic delay profile.

With respect to interconnects, row-column arrays have been investigated as a means of reducing interconnect complexity as they can be addressed using only row and column electrodes, sometimes referred to as top orthogonal to bottom electrode (TOBE) arrays. TOBE arrays have been implemented with piezoelectrics, capacitive micromachined ultrasound transducers, and more recently electrostrictive realizations. Unlike piezoelectric implementations, CMUT- and electrostrictive implementations of TOBE arrays offer bias-sensitivity, which can be used advantageously for novel imaging schemes. These have included Simultaneous Azimuthal and Fresnel Elevational (SAFE) compounding, which exploits Fresnel-lens-based elevational focusing. Importantly, each element of such a bias-sensitive TOBE array can be addressed by biasing a row and transmitting or receiving from a column. Hadamard or S-Matrix-encoded biasing schemes may also be used to improve signal-to-noise ratio.

Such Hadamard-encoding schemes have also been put to use for aperture-encoded synthetic aperture imaging using an imaging scheme referred to as Fast Orthogonal Row-Column Electronic Scanning (FORCES). FORCES involves biasing columns with a sequence of Hadamard biasing patterns while transmitting pulses along rows with focal delays to create a cylindrical elevational transmit focus. By using a new Hadamard pattern for each of N transmit events, while receiving echoes from columns, an encoded synthetic transmit aperture dataset is collected. After decoding by multiplying by an inverse Hadamard matrix, the decoded channel dataset represents a synthetic transmit aperture dataset, consisting of a received signal from each element for each respective (elevationally-focused) transmitting column. FORCES may be used to produce elevationally-steerable B-scans with image quality superior to previous non-encoded row-column imaging schemes and significantly superior to Explososcan schemes constrained by a similar total channel count. These contributions were significant because it demonstrated the potential advantages of using a bias-switchable row-column array and unlike previous row-column imaging schemes with non-bias-sensitive arrays, illustrated B-scan image quality comparable to that from a linear array. Moreover, unlike a linear array, our methods provided electronic elevational focusing control, electronic scan-plane steering, and 3D imaging.

SUMMARY

According to an aspect, there is provided an ultrasonic transducer system comprising a bias-switchable, ultrasonic transducer array comprising a bias-sensitive ultrasonic layer having a top surface and a bottom surface, top electrode strips in electrical contact with the top surface of the bias-sensitive ultrasonic layer, bottom electrode strips in electrical contact with the bottom of the bias-sensitive ultrasonic layer, the bottom electrode strips being oriented at a non-zero angle relative to the top electrode strips, and a bipolar voltage source connected to each of the top electrode strips and each of the bottom electrode strips to induce a polarization in the dielectric layer, the bipolar voltage source comprising solid state transistors capable of switching between a high bias voltage and a low bias voltage that differ by 25V or more at a switching speed of less than 1 millisecond and are able to withstand at least 20 mA of peak current.

According to other aspects, the ultrasonic transducer system may comprise one or more of the following features, alone or in combination: the ultrasonic imaging system may further comprise a leakage-current mitigation layer; the leakage-current mitigation layer may comprise an electrically-conductive shielding layer that is electrically isolated from the top electrodes and electrically connected to an external electrical potential or a dielectric isolation layer having a thickness sufficient to minimize leakage currents from at least 5 mA to at least 1 mA or less; the electrically-conductive shielding layer may be maintained at a ground potential or a potential of a subject being imaged; the ultrasonic transducer system may further comprise an additional electrically insulating layer adjacent to the electrically-conductive shielding layer; the electrically-conductive shielding layer may comprise an acoustical matching layer, or is less than a quarter of an acoustic wavelength associated with a center operating frequency; the bias-sensitive ultrasonic layer may be a CMUT layer or a dielectric material or composite dielectric material, wherein the dielectric material or composite dielectric material comprises an electrostrictive material, a ferroelectric material, a relaxor ferroelectric material, a weak ferroelectric material, a non-ferroelectric material, or combinations thereof; the array may comprise physical apodization such that a transmit and receive sensitivity of the array is weaker near an outer perimeter of the array compared to a center; the physical apodization may be implemented by tapering the top electrode strips, the bottom electrode strips or both the top electrode strips and the bottom electrode strips to have reduced surface area near the edge of the array or lowering the fraction of high-dielectric constant material near the edge of the array; the array is integrated into a wearable form factor, a form factor that is mountable on a subject, a handheld probe, or an endoscopic or laparoscopic form factor for imaging inside the subject; the ultrasonic transducer array may be in a planar, spherical concave, spherical convex, plano-concave, or plano-convex shape; the ultrasonic transducer system may further comprise voltage protected pre-amplifiers in a probe; the ultrasonic transducer system may further comprise a multiplexer that connects a plurality of channels of pulsing/receiving electronics and biasing electronics to a plurality of top electrode strips, bottom electrode strips, or both top electrode strips and bottom electrode strips, via a switch array; the biasing electronics may be coupled to the ultrasonic transducer array and the pulsing/receiving electronics; the pulsing/receiving electronics and bias-switching electronics may be combined into a single circuit based on multiple voltage-state solid-state electronics; the biasing electronics may be coupled to the switch array and to the pulsing/receiving electronics by means of a bias tee; where the biasing electronics and pulsing electronics of the pulsing/receiving electronics may be coupled to the top or bottom electrode strips and where receiving electronics of the pulsing/receiving electronics may be coupled to the other of the bottom or top electrode strips; the ultrasonic transducer system may further comprise electrical matching networks to improve impedance matching between the ultrasonic transducer array and the pulsing-receiving electronics; the bias-switching electronics may be located in the housing of a connector to connect the cable-bundle-tethered array to an imaging system; the switching speed between voltage states may be less than a pulse-repetition interval of the pulsing electronics; the bipolar voltage source may comprise a positive voltage state, a negative voltage state, and a ground state; the bipolar voltage source may comprise a high-impedance state where the resistance is 100 KOhms or more; the high bias voltage and the low bias voltage may differ by 100V or more; the bipolar voltage source may switch between the high bias voltage and the low bias voltage immediately after a transmit event and prior to recording echo signals; a maximum tolerated voltage magnitude of the ultrasonic transducer array may be greater than a sum of a transmit pulse magnitude and a maximum bias voltage magnitude; the bipolar voltage source may comprise differential inputs; the bipolar voltage source may be connected to a 2-to-4 decoder that defines the voltage state; the bipolar voltage source may be capable of 100V switching or greater; the bipolar voltage source may comprise transistors that are capable of withstanding 1 A peak current or more; and the ultrasonic transducer array may comprise one or more acoustic matching layers on the front side of the array and/or one or more acoustically absorbing backing layers on the back side of the array According to an aspect, there is provided an ultrasonic imaging system, comprising a bias-switchable, ultrasonic transducer array comprising a bias-sensitive ultrasonic layer having a top surface and a bottom surface, top electrode strips in electrical contact with the top surface of the bias-sensitive ultrasonic layer, and bottom electrode strips in electrical contact with the bottom of the bias-sensitive ultrasonic layer, the bottom electrode strips being oriented at a non-zero angle relative to the top electrode strips, a bipolar voltage source connected to each of the top electrode strips and each of the bottom electrode strips to induce a polarization in the dielectric layer, the bipolar voltage source comprising solid state transistors capable of switching between a high bias voltage and a low bias voltage that differ by 25V or more at a switching speed of less than 1 ms and are able to withstand at least 20 mA of peak current, pulsing electronics and receiving electronics electrically connected to the ultrasonic transducer array, a controller for controlling the bipolar voltage source, the pulsing electronics, and the receiving electronics, and an imaging system that generates an image of a sample based on signals received by the receiving electronics.

According to an aspect, there is provided fast bias-switching electronics plus pulsing and receiving electronics for each row and each column of a TOBE array to enable suitable imaging schemes that may benefit from this flexibility.

According to an aspect, there is provided bias-switching electronics for a transducer array that permits a) high bias voltage (magnitudes greater than 25V, or 50V, or 100V, or 200V) switching with repetition rates fast enough to achieve ultrafast imaging rates with pulse-repetition rates (and thus switching rates) of more than 1000 KHz and b) circuit designs capable of not only high bias voltages but also capable of surviving high transmit voltage pulses, which may depend on the bias voltage. Solid-state high-voltage switches may be used that are rated for +/−100V and a 100V bias voltage plus a 100V transmit pulse, which together may reach peak voltage magnitudes of greater than 200V. The peak currents from a combination of fast bias switching and/or transmit pulses from a pulser-receiver may be very large (>100 mA up to more than 1 A). Additionally, the solid state switches may protect against sensitive digital signals used to control the voltage states from being scrambled.

According to other aspects, there is provided a bias-switchable row-column 2D ultrasound transducer array system that may be capable of 3D and steerable 2D ultrasound imaging, and that may have handheld or wearable formats. Rather than requiring a wire from every element of a 2D array, which becomes unwieldy for large element counts, the array uses row- and column-addressing.

In some aspects, apodization may be used to reduce edge-wave artifacts, which may reduce image quality in the axial or depth direction. A physical apodization may be incorporated in the array by either tapering the top and bottom electrode strips, or by changing the fraction of active material in the composite layer.

In some aspects, shielding may be incorporated into an array that may be suitable for ultrafast imaging, which requires rapid high-voltage switching and that may generate unwanted leakage currents, which could pose electrical safety hazards to subjects. A shielding layer may be incorporated into the system, such as between the subject and the electrodes of the array. The shielding layer may be selected to avoid significant impacts on the acoustic performance of the array.

In some aspects, a suitable dielectric material may be selected that may have a high dielectric coefficient. Non-ferroelectric materials or weakly ferroelectric materials may be selected to avoid or reduce undesired spontaneous polarization, which may lead to unwanted asymmetries in acousto-electric performance. For example, an imaging schemes that uses a pulsed transmit signal due to a positive bias may also require the exact opposite polarity of the same pulse but with a negative bias, which may be impacted if there is a residual polarization present in the material. In addition, a non-ferroelectric material may reduce unwanted heating that may result in other materials as a result of the fast switching of material polarization since it requires energy to reverse the polarization of the material. A suitable material may have high electrostriction, such as a material that has a high dielectric constant.

In some aspects, the system may include fast solid-state bias switching electronics and pulsing and receiving electronics for each row and for each column of a bias switchable row-column array.

In some aspects, the bias-switchable array may be incorporated into a wearable form factor or into a mountable device that may be placed on a patient for hands-free operation. This would enable steerable 2D or even 3D imaging of a subject longitudinally for the first time and could be of considerable value in critical care or surgical settings.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

An ultrasonic transducer array and an imaging system will now be described with reference to FIG. 1 through 19.

Figure 1:
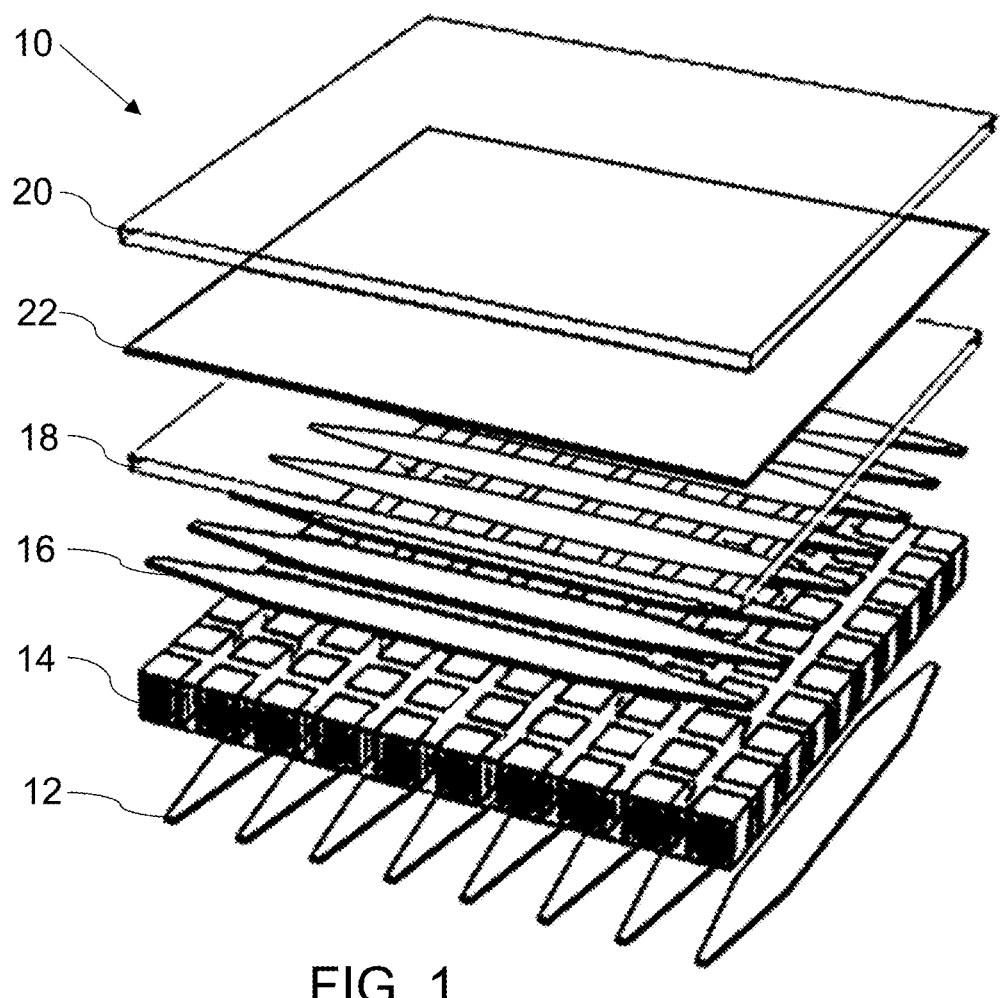
FIG. 1 is an exploded perspective view of an ultrasonic transducer array.

Referring to FIG. 1 ultrasonic transducer array 10 includes bottom electrodes 12, a bias-sensitive ultrasonic layer 14 (in this case a 1-3 electrostrictive relaxor composite), and top electrodes 16. Layers 12, 14, 16 are used to generate and receive ultrasonic signals that are then used to produce an image of a sample. While electrodes 12 and 16 are shown and described as being generally orthogonal herein, it will be understood that they may be at other angles that still permit the transmission and reception of ultrasonic signals. Other layers may also be present, such as an insulation layer 18 to insulate the patient from electrical signals and/or heat generated by array 10, a matching layer 20 used to improve the coupling of ultrasonic signals to the sample and a shielding layer 22 used to shield the patient from electrical signals. In one example, shielding layer 22 may be a thin grounded conducting layer sandwiched between two matching layers with the objective of reducing the coupled leakage currents while minimizing or avoiding any adverse effects on the operation of array 10.

Other layers may be included beyond those depicted that perform the same or different functions such one or more acoustically absorbing backing layer, or the number of layers may be reduced by incorporating more than one function into one or more layers. For example, dielectric layer 14 may be a composite of multiple layers or materials that may improve the functionality of array 10, as is known in the art.

In one example, a transducer may be fabricated by lapping an electrostrictive PMN-PT 1-3 composite to the desired thickness to form layer 14, with electrodes patterned on both sides of the sample as layers 12 and 16 to form an array. An apodization may be applied by lithographically tapering the electrode in layers 12 and 16, as shown in FIG. 1, or by reducing the dielectric material at the edges of array 10.

Figure 2:
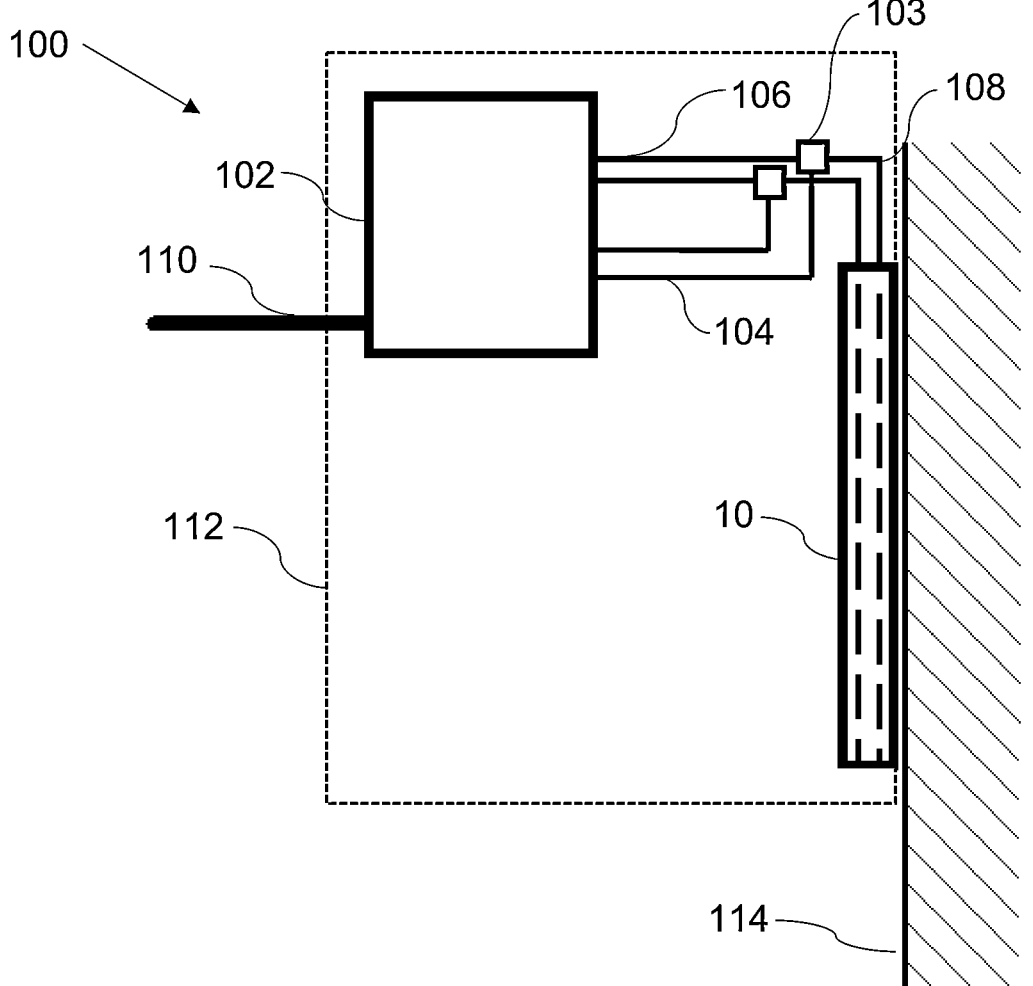
FIG. 2 is a block diagram of an imaging system.

Referring to FIG. 2, a system 100 includes array 10 connected to a control module 102. Control module 102 is depicted as a single module but may be one or more separate modules. In addition, some components may be incorporated into array 10, for example. Control module 102 provides bias voltages along power lines 104 and sends and receives electrical signals along signal lines 106. Bias voltages and signals are connected to the electrode layers in array 10 using lines 108. Control module 102 may be programmed to generate and receive signals or may be instructed by an external processor. Control module 102 may include a communication line 110, which may be a wired or wireless communication line. Control module 102 may include a processor that interprets or partially interprets the received signals or communicate the results to an external processor. Control module 102 may include a display to display the generated image or may include audio or visual signals to indicate the status or to generate alarms.

System 100 may include a housing 112 that may be adapted to be a wearable device or incorporated into one, or incorporated into a standalone unit, a handheld probe, an endoscopic or laparascopic form factor for imaging inside the body or incorporated into other diagnostic equipment that is able to image a sample 114 of a subject. This may also include trans-esophageal, trans-rectal, trans-vaginal, and intravascular probes. If the system is intended to include a wearable housing or to be used as a handheld probe, the total weight may be 3 lbs or less.

Additional detail regarding the elements in FIGS. 1 and 2 will be discussed below.

Piezoelectric, Electrostrictive and Dielectric Materials

The forward piezoelectric effect involves material strain upon applying an electric field, usually from applying a voltage between a top and bottom electrode. The inverse effect involves creation of voltages upon application of a force. These effects are due to molecular asymmetries and require polarized domains in the material. These domains are polarized via a poling process with high voltages and high temperatures. When the material cools, residual polarization results in the piezoelectric behavior with strains and voltages roughly linearly proportional. Piezoelectric materials exhibit both a forward and inverse piezoelectric effect. Electrostrictive materials, in contrast have no inverse piezoelectric effect, that is, unless there is an applied bias voltage.

Electrostriction is a property of all dielectric materials and is caused by displacement of ions in the crystal lattice upon being exposed to an external electric field. Positive ions will be displaced in the direction of the field, while negative ions will be displaced in the opposite direction. This displacement will accumulate throughout the bulk material and result in an overall strain (elongation) in the direction of the field. The thickness will be reduced in the orthogonal directions and may be characterized by Poisson's ratio. Insulating materials consisting of more than one type of atom will be ionic to some extent due to the difference of electronegativity of the atoms, and therefore exhibit electrostriction.

The resulting strain (ratio of deformation to the original dimension) is proportional to the square of the polarization. Reversal of the electric field does not reverse the direction of the deformation.

The related piezoelectric effect occurs in a particular class of dielectrics. Electrostriction applies to all crystal symmetries, while the piezoelectric effect applies to the 20 piezoelectric point groups. Electrostriction is generally a quadratic effect, while piezoelectricity is generally a linear effect.

Ferroelectrics have a spontaneous but reversible polarization. Piezoelectric materials are ferroelectrics and may require poling to be piezoelectric without any applied bias voltage. Relaxor ferroelectrics are ferroelectric materials that exhibit high electrostriction.

As mentioned, electrostrictive materials exhibit strains that are quadratic with applied voltages. In tensor notation, a strain may be modelled as $\epsilon_{ij}=Q_{ijkl}D_kD_l$, where $Q_{ijkl}$ is the electrostriction tensor, and $D_k$ are components of the electric displacement field, equal to the sum of applied electric field and residual polarization: $D_k=\epsilon E_k+P_k$.

More generally, the displacement field may be viewed as a component of the electric field that changes quickly, and a component associated with a slower polarization response. This may be written as:

$$D(t)=\epsilon_0[\epsilon_\infty E(t)+\dot{\Phi}(t)*E(t)],$$

where $\Phi(t)=(\epsilon_r-\epsilon_\infty)[1-\phi(t)]$, * is temporal convolution, $\phi(t)= P(t)/P(0)$, and $\epsilon_r$ and $\epsilon_\infty$ are the low- and high-frequency limits of relative dielectric permittivity. The complex frequency-dependent permittivity is related to $\phi$ as:

$$\frac{\varepsilon^*(\omega)-\varepsilon_\infty}{\varepsilon_r-\varepsilon_\infty} = \mathcal{L}\left\{-\frac{d}{dt}\phi(t)\right\},$$

where $\mathcal{L}$ is the Laplace Transform operator. The Debye model for $\phi$ is a decaying exponential:

$$\phi(t) = e^{-\frac{t}{\tau_m}}u(t)$$

where u(t) is a step function and where $\tau_m$ is the characteristic relaxation time. Other more complex phenomenological models of relaxation have also been proposed.

When the thickness-mode excitation axis is k=3, and electric fields are applied in this direction, the relevant strain is $\epsilon_{33}\propto Q(\epsilon E_3+P_3)^2$, where $Q=Q_{3333}$. Dropping subscripts for convenience, the AC strain due to a transient voltage excitation $\delta E$ is $\epsilon_{AC}\propto HPF\{(\epsilon(\delta E)+P)^2\}\propto\epsilon P\delta E$ to first order in $\delta E$. This is the forward piezoelectric effect showing linearity with excitation voltage. Thus piezo-electricity is described here as an electrostrictive effect when there is a residual polarization present. For a purely electrostrictive non-ferroelectric material, there is no residual polarization, $P_k=0$. However, if the transducer is biased with a DC electric field $E_3$, then, again dropping subscripts: $\epsilon_{AC}=h(t)*\epsilon_{33}$ where h is the bandpass transducer electromechanical response, thus $\epsilon_{AC}=h*Q\{D(t)^2\}$. Expanding, we have $$\epsilon_{AC} = h(t)*\left(\epsilon_0\left[\epsilon_\infty E(t) + \dot{\Phi}(t)*E(t)\right]\right)^2 Q =$$
$$h(t)*\left(\epsilon_0\left[\epsilon_\infty(E + \delta E) + \dot{\Phi}(t)*(E + \delta E)\right]\right)^2 Q = h(t)*$$
$$\left\{\epsilon_0^2\epsilon_\infty^2(E + \delta E)^2 + 2\epsilon_0\epsilon_\infty(E + \delta E)\epsilon_\infty\dot{\Phi}(t)*(E + \delta E) + \epsilon_0^2\left[\dot{\Phi}(t)*(E + \delta E)\right]^2\right\}Q$$

When E(t)=E is a constant DC field, we have $$\dot{\Phi}(t)*E(t)=E\int_{-\infty}^{\infty}\dot{\Phi}(t)dt=-E(\epsilon_r-\epsilon_\infty)\int_0^\infty\dot{\phi}(t)dt=(\epsilon_r-\epsilon_\infty)E$$
$$(\phi(0)-\phi(\infty))=(\epsilon_r-\epsilon_\infty)E.$$

when the material has a large relative dielectric constant, as in our case (e.g. PMN has a giant relative permittivity of 20,000), the relative permittivity $\epsilon_r>>\epsilon_\infty$ and we have that $\dot{\Phi}(t)*E\approx\epsilon_r E$.

Also, when the transducer is driven with an AC electric field $\delta E(t)$ with a frequency much higher than the relaxation-rate $1/\tau_m$, the material cannot adequately respond and $\dot{\Phi}(t)*\delta E\approx0$ (or small). Thus, $$\dot{\Phi}(t)*(E+\delta E)\approx\epsilon_r E.$$

Simplifying with these approximations:

$$\epsilon_{AC}\approx h(t)*\{\epsilon_0^2(2E\delta E+\delta E^2)+2\epsilon_0\epsilon_\infty\delta E\epsilon_0\epsilon_r E\}Q=h(t)*$$
$$\{\epsilon_0^2\epsilon_\infty^2(1+\epsilon_r/\epsilon_\infty)2E\delta E(t)+\epsilon_0^2\epsilon_\infty^2\delta E^2(t)\}Q$$

When $\epsilon_r>>\epsilon_\infty$, and when $\epsilon_r E>>\epsilon_\infty\delta E$ (i.e. $\delta E/E<<\epsilon_r/\epsilon_\infty$), this becomes simply $$\epsilon_{AC}\approx 2Q(\epsilon_0^2\epsilon_\infty\epsilon_r E)(h(t)*\delta E(t))=h(t)*2QP_I(\epsilon_0\epsilon_\infty\delta E(t))$$

Here $P_I=\epsilon_r E$ is an induced polarization, and $2QP_I$ is an effective (induced) piezoelectric coefficient.

Thus, the material behaves like a piezoelectric material with approximate linearity in driving voltage $\delta E$. Importantly, the induced polarization $\epsilon E$ has a polarity dependent on the biasing field polarity. This leads to important properties that we require for bias-encoded imaging schemes discussed below. In particular, the response to an excitation $\delta E$ with a positive bias is the same as that of an amplitude-inverted excitation $-\delta E$ with a negative bias: $\epsilon_{33}=Q(E_3+\delta E_3)^2=Q(-E_3-\delta E_3)^2$. Also, $Q(E_3-\delta E_3)^2=Q(-E_3+\delta E_3)^2$. Likewise, measured voltage signals $\delta V\propto\delta E$ depend linearly on AC strain and bias voltage to first order. Thus, the received signal due to a pressure transient op received with a positive bias voltage is effectively polarity inverted with a negative bias voltage. This property is key for needed imaging schemes with proposed arrays.

TOBE Arrays for Ultrasound Imaging

Recently, bias-switchable "top-orthogonal-to-bottom" (TOBE) 2D arrays for 3D ultrasound and photoacoustic imaging have been developed, an example of which is shown in FIG. 1. Also called row-column arrays, these arrays have top electrode column electrodes orthogonal to bottom electrode row electrodes. The array is generally designed to be orthogonal, however, the electrodes may be at other non-orthogonal and non-parallel angles, provided that the system is able to generate adequate results.

Rather than requiring addressing of every element as in a fully-wired array, TOBE arrays operate by addressing only rows and columns. Non-bias-switchable piezoelectric crossed electrode arrays and other variants including with micromachined transducers may be used. Unlike piezoelectric materials, CMUTs- and electrostrictive-relaxor based crossed electrode arrays may allow additional control and multiplexing by using bias voltages as discussed below. Electrostrictive-relaxor crossed electrode arrays may also be used, which become piezoelectric upon the application of a bias voltage and the polarity of the material depends on the polarity of the bias voltage. This may be used to generate unique bias-controlled readouts of row-column electrostrictive arrays. In particular, the response to an excitation with a positive bias may be the same as that of an amplitude-inverted excitation with a negative bias. Likewise, the received signal due to a pressure transient op received with a positive bias voltage is effectively polarity-inverted with a negative bias voltage.

Figure 3:
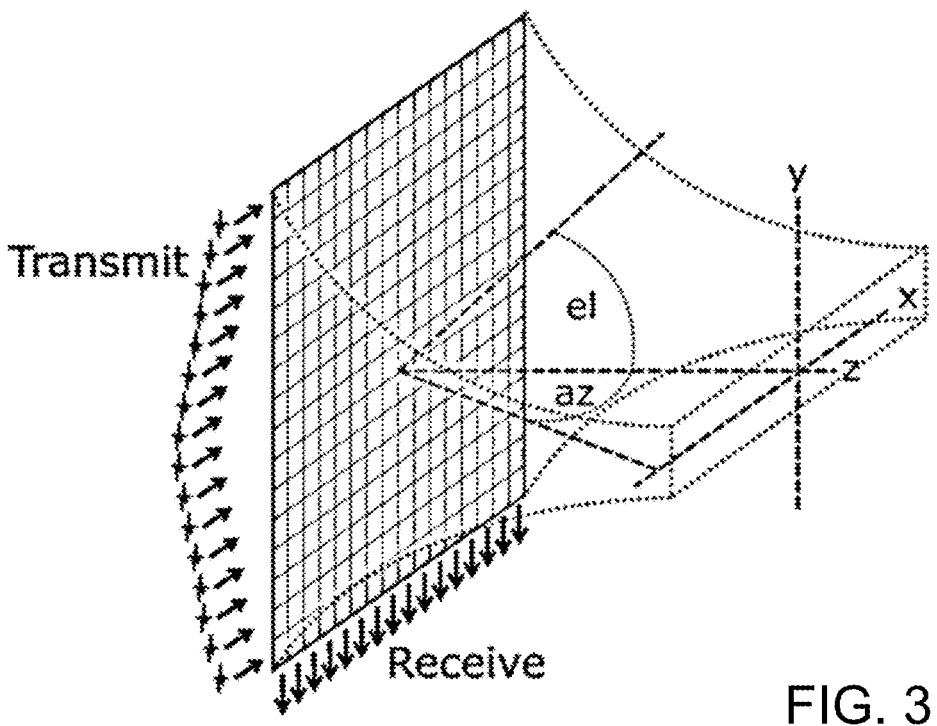
FIG. 3 is a schematic diagram of an ultrasonic imaging scheme based row-column scanning.

Many ultrasound imaging schemes have been demonstrated with TOBE arrays. One imaging scheme is row-column scanning (which is referred to as "Scheme 1", and is shown in FIG. 3. This involves one-way elevational transmit focusing and one-way receive azimuthal focusing and may be implemented without any bias encoding. The advantage of this approach is that it can achieve volumetric imaging very quickly (with ~N transmits for an N×N array), however there may be some clutter due to lack of two-way focusing. Another imaging scheme is synthetic aperture-based scanning using bias encoding. By biasing a column and transmitting on a row, only the intersecting element produced appreciable transmit/receive sensitivity. Thus, by addressing only rows and columns, single element control is made possible. More complicated imaging schemes may then be used using superposition principles, such as Simultaneous Azimuthal and Fresnel Elevation (SAFE) Compounding, which produced high-quality 3D scans, but required significant coherent compounding.

Figure 4:
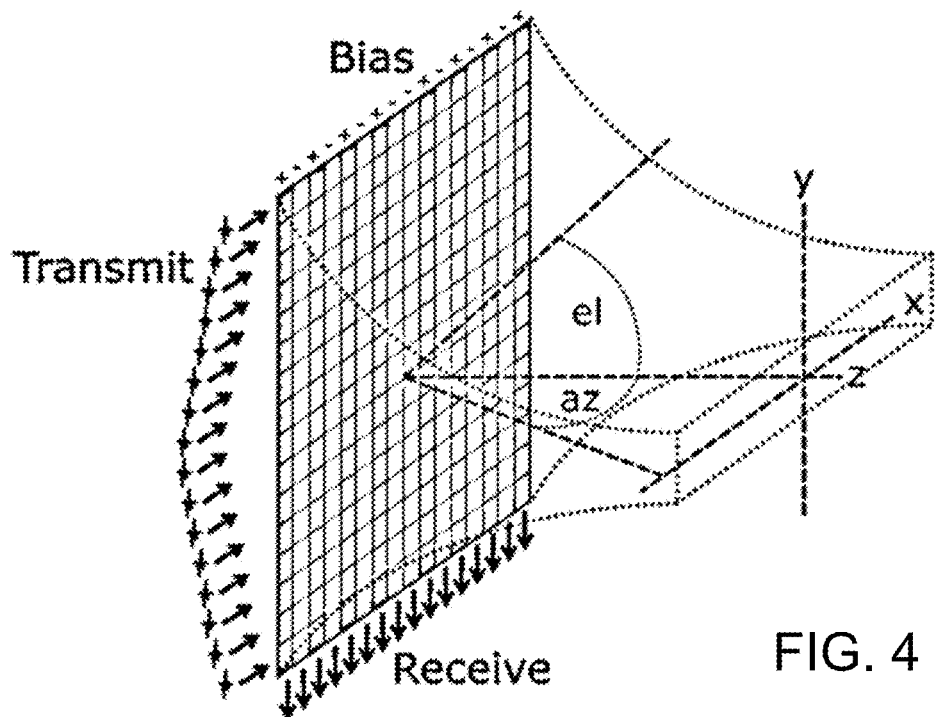
FIG. 4 is a schematic diagram of an ultrasonic imaging scheme based on fast orthogonal row-column electronic scanning.
Figure 5:
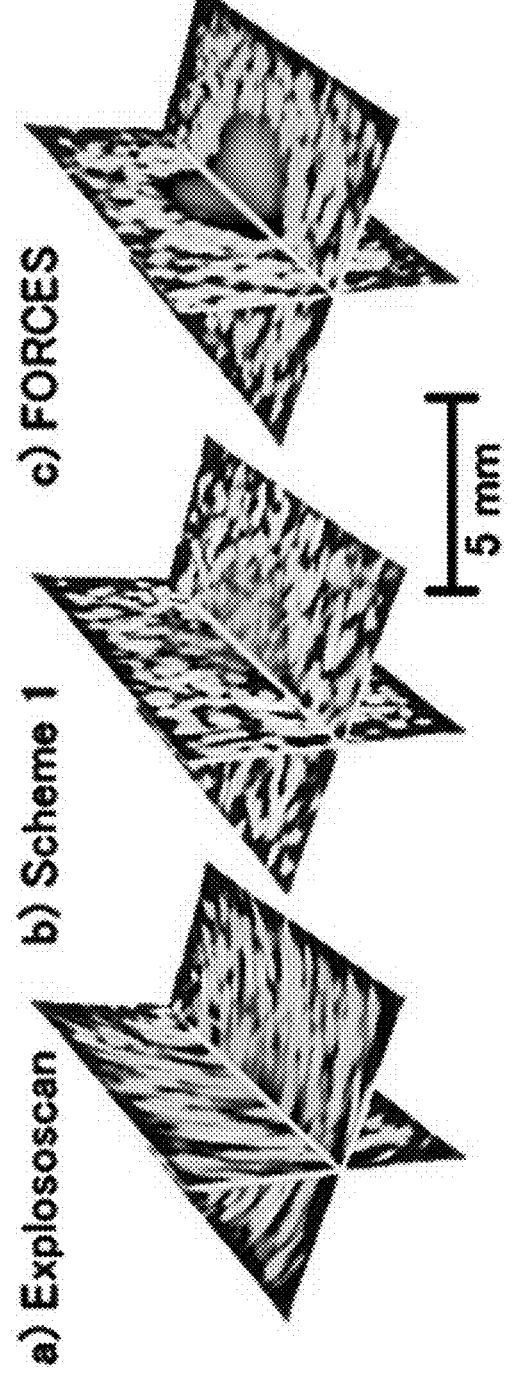
FIG. 5 is a comparison of 3-D images obtained using different ultrasonic imaging schemes.
Figure 6:
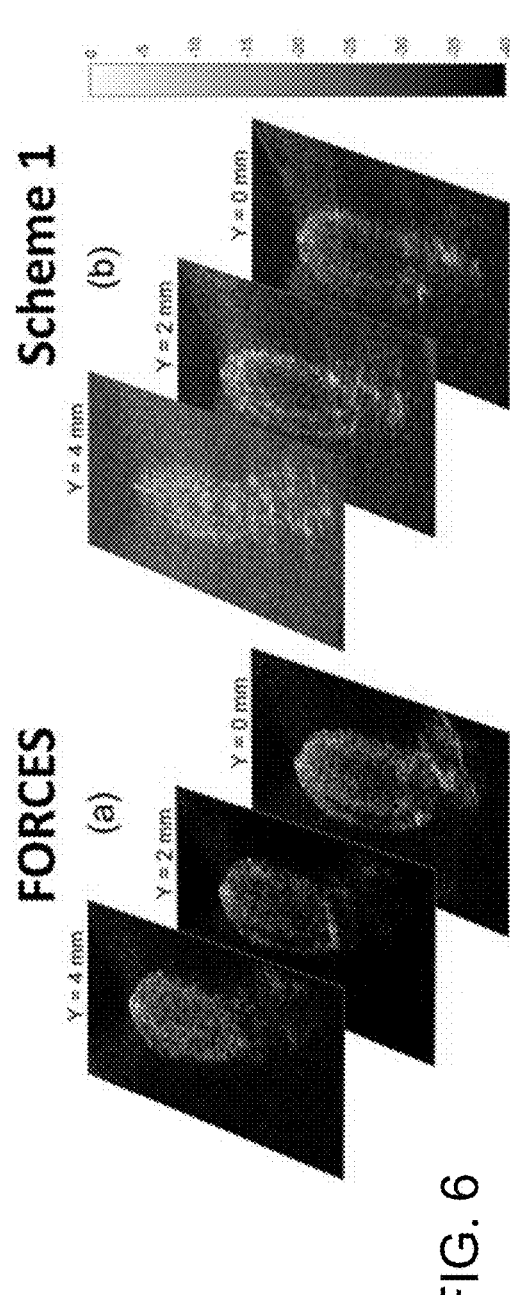
FIG. 6 is a comparison of 2_D images obtained using different ultrasonic imaging schemes.

Additionally, referring to FIG. 4, another imaging scheme may include Fast Orthogonal Row-Column Electronic Scanning (FORCES). This scheme may be used to achieve high B-mode image quality with high SNR and improved in-plane two-way synthetic aperture focusing with flexible electronic steering capacity. FORCES involves elevational transmit focusing by transmitting on rows, while biasing columns with a bias pattern (indicated by "+" and "−" symbols in FIG. 4) selected from columns of a Hadamard Matrix. After N transmit events, each using a unique Hadamard vector, the channel data from columns is decoded using an inverse Hadamard Matrix to recover an effective synthetic aperture dataset for two-way in-plane focusing but only one-way elevational transmit focusing. Importantly, the Hadamard aperture encoding enables a $\sqrt{N}$ SNR enhancement compared to synthetic aperture imaging when activating only a single column at a time. The image quality of FORCES has been found to be superior to both an industry-standard Explososcan method and Scheme 1. FIG. 5 compares the results of simulations of a cyst phantom using (a) Explososcan, (b) Scheme 1, and (c) FORCES, and FIG. 6 compares the results of simulations of a rat heart using (a) FORCES and (B) Scheme 1.

Material Selection

Previous row-column arrays used piezoelectrics or relaxor materials, which are ferroelectrics. Ferroelectrics have a spontaneous but reversible polarization. Piezoelectric materials are ferroelectrics and may require poling to be piezoelectric without any applied bias voltage. It has been found that the materials used for these arrays may also include non-ferroelectric dielectrics that may have large dielectric constants. It will be understood that "non-ferroelectric" is intended to include materials that are weak ferroelectrics, i.e. materials that are sufficiently weakly ferroelectric to achieve results sufficiently similar to non-ferroelectrics in a given array. Relaxors are one sub-class of non-dielectrics, but are typically ferroelectric and may have residual spontaneous polarization, even at room temperature. As this may be undesirable, non-ferrolectric (or weak ferroelectric) dielectric materials may be selected that have minimal or no spontaneous polarization. This allows for improved symmetry of positive and negative waveforms. In one example, a suitable material may be a non-(or weakly-) ferroelectric dielectric or non-ferrolectric electrostrictive material. The material may have a large electrostrictive coefficient, or the material may have a large dielectric constant, which is particularly useful when used with a strong bias voltage.

Switchless Connection to Rows and Columns

The biasing electronics, pulsing electronics and receive electronics may be connected to each row and each column simultaneously, using solid state switching electronics. Solid-state bias switching electronics are able to switch faster than relays, and permit high-voltage transmitting and weak-signal receiving on each row and column. This may be used to provide flexibility for the imaging schemes that may be executed using the row-column arrays. For example, while FORCES requires biasing on columns and pulsing on rows, while receiving on columns to achieve a steerable depth-azimuthal imaging plane, the roles of rows and columns may be electronically reversed to obtain imaging in the orthogonal depth-elevation imaging plane. Additionally, other schemes may require pulsing and biasing on columns while receiving on rows. Thus, not all imaging schemes will make use of pulsing, receiving, and biasing simultaneously for every column (and/or every row) but to achieve the maximum imaging flexibility, pulsing, receiving and biasing may be provided for each channel. In order to permit certain imaging schemes, the electronics may be designed to accommodate a high bias voltage in combination with a high transmit pulse. Imaging schemes that involve high transmit pulsing and fast bias switching may also produce a lot of peak current that may damage electronics if not properly designed. As such, bias switching electronics may include high-voltage transistors such that the voltage rating of the transistors is greater than the combined bias and pulsing voltage magnitudes.

Reducing Edge-Wave Artifacts

It has been found that the quality of images from some imaging schemes may be reduced relative to clinical imaging arrays as a result of edge-wave artifacts.

To address this, a physical apodization scheme may be used to mitigate edge-wave artifacts, ash as a tapered electrode structure as is depicted in layers 12 and 16 of FIG. 1. Alternatively, a composite material between layers 12 and 16 may be reduced toward the edges. This approach uses dielectric materials rather than CMUT materials.

Figure 7:
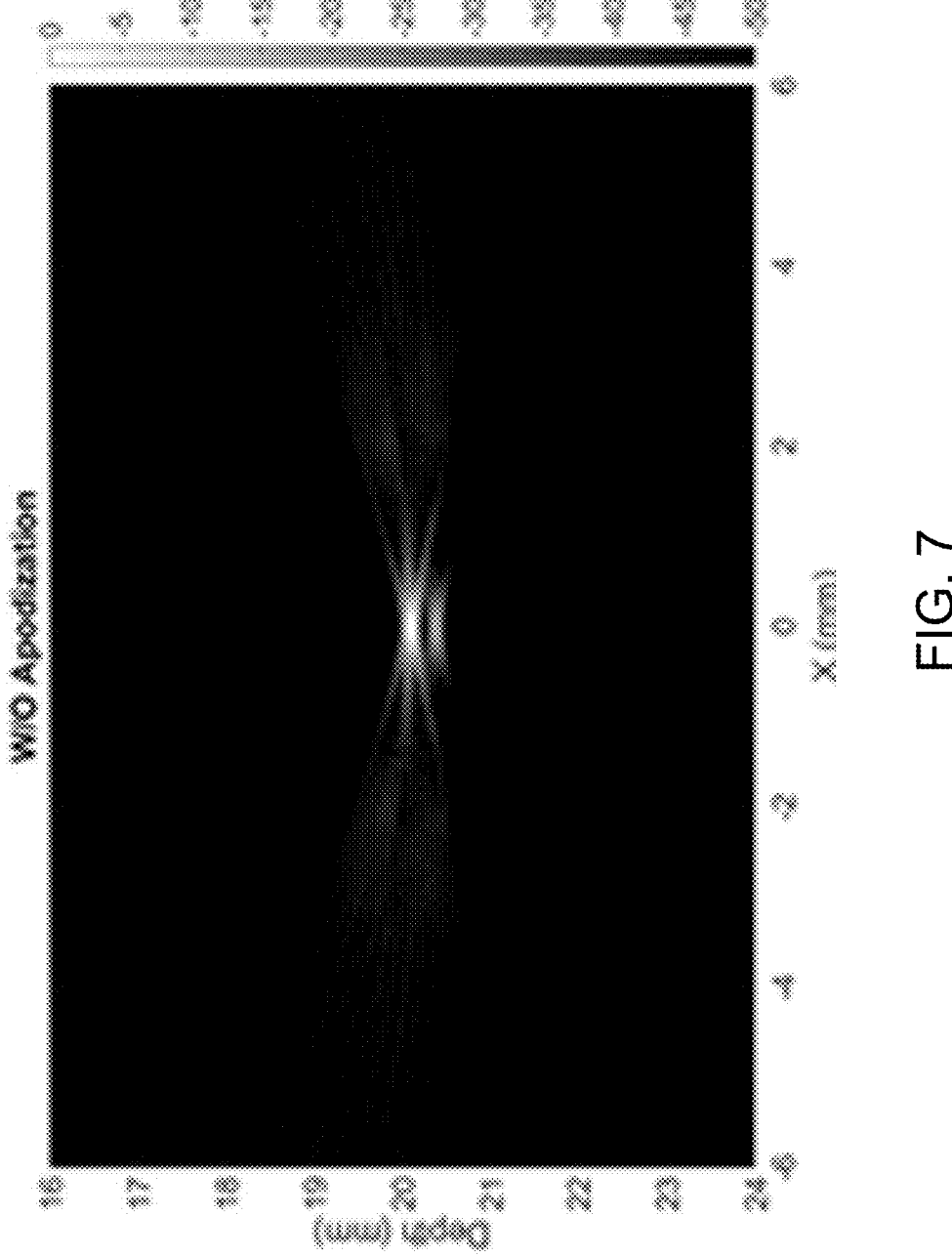
FIG. 7 is an image obtained using an ultrasonic transducer array without apodization.
Figure 8:
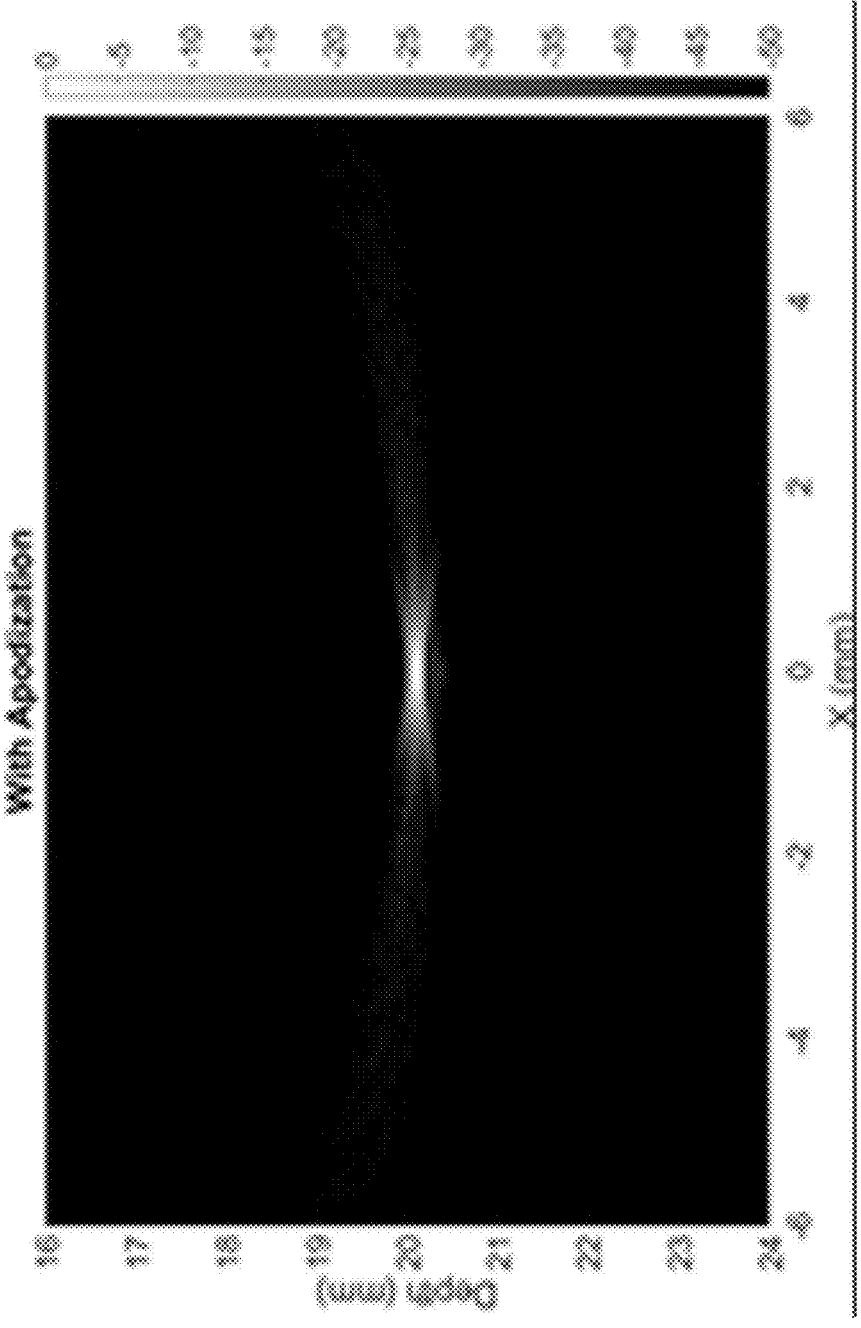
FIG. 8 is an image obtained using an ultrasonic transducer array with physical apodization.

The images in FIGS. 7 and 8 contrast imaging results obtained from a device without apodization (FIG. 7) and the improved results obtained with physical apodization (FIG. 8).

Fast Bias-Voltage Switching

In order to achieve imaging depths useful for medical imaging purposes while using fast bias-voltage switching to increase image-capturing speeds, high bias-voltages with high switching frequencies may be used. In some cases, the array may switch between voltage levels that differ by more than 50V or by more than 100V. In addition, the voltage of the signal applied, the absolute value of which is generally limited by the bias voltage, may result in an instantaneous voltage that is even higher. During fast bias-voltage switching, the array may be subjected to bias switching in less than 1 ms, or less than 10 μs. In some cases, the transducer array may be designed to withstand transmit pulses of +/−50 V using high voltage transistors capable of at least 150V with peak currents of at least 200 mA.

In some cases, this fast bias-voltage switching may result in unsafe AC leakage currents, even when an insulating matching later is present. This may be mitigated by include a leakage current mitigation layer to minimize unwanted AC or RF leakage currents, which could endanger an imaging subject. This may be implemented in a manner minimally impacts image quality.

In addition, to achieve desired ultrafast volumetric imaging rates, specialized fast bias switching electronics may be used, which are absent on conventional ultrasound imaging systems. For diagnostic frequencies, electrostrictive row-column arrays may require bias voltages of up to +/−200V and require microsecond-scale switching times.

To address this, bias switching electronics may be used within an imaging system to achieve fast switching. Referring to FIG. 2, these electronics may be found in control module 102 or in switch block 103. In some examples, bias switching electronics may be capable of switching the bias voltage of each channel (i.e. each column and row electrode) individually. In some examples, signals may be transmitted and received by each individual electrode.

A dielectric array architecture may be used that is designed to transduce voltage-to-force or force-to-voltage when a bias voltage is present, but this transduction efficiency reduces to zero when there is no bias voltage present or when this bias voltage is 0V. As such, the array material need not be a piezoelectric material, or even a dedicated relaxor or electrostrictive material but only composed of dielectric material, ideally with a very large dielectric constant.

The row-column ultrasonic transducer system, which may be incorporated into an imaging system, may include such bias-switching electronics as part of the transducer or imaging system.

High Voltage Electronics

As noted herein, bias-switchable arrays intended for diagnostic frequencies (i.e. with center frequencies <20 MHz) may be subjected to high bias voltages. As opposed to high-frequency arrays, which may use a thin electrostrictive layer, and thus require only moderate bias voltages to induce the needed polarization for efficient operation, lower diagnostic frequencies typically require high bias-voltage operation to achieve the same electric fields in the material for needed polarization and electromechanical efficiency. In one example, a 10 MHz array may require, for example, 50-60V bias voltages, while a 5 MHz array may require at least 100V bias voltages, and a 2.5 MHz array may require 200V bias voltage magnitudes. In one example, the controller may have the following states: a positive voltage of 50V, a negative voltage of −50V or more, a ground, and a high impedance state (having impedance>100 KOhms or more). The circuitry may be capable of also withstanding high voltage transmit pulses having voltage magnitudes of 50V or more and switching between voltage levels differing by more than 50V in less than 1 ms.

To implement these examples, the electronics must be designed to handle these high voltages quickly and without damaging or scrambling sensitive digital electronics.

Some considerations associated with bias-switching electronics may include achieving a) high bias voltage (magnitudes>50V) switching with repetition rates fast enough to achieve ultrafast imaging rates with pulse-repetition rates (and thus switching rates) of >1000 KHz and b) circuit designs capable of not only high bias voltages but also which can survive high transmit voltage pulses, such as magnitudes>50V). If a solid-state high-voltage switches is rated for +/−100V, it will be incapable of handling a 100V bias voltage plus a 100V transmit pulse, which may reach peak voltage magnitudes of >200V. In addition to voltage, the peak currents from a combination of fast bias switching and/or transmit pulses from a pulser-receiver may be very large, such as a current greater than 100 mA, or up to 1 A or more, which may damage electronics. Additionally, such high-voltage pulses may scramble sensitive digital signals used to control the voltage states.

To account for these considerations, the bias switching electronics may use fast high-voltage transistors capable of switching to voltage magnitudes greater than the combined needed bias voltage plus the transmit voltage magnitudes, and capable of sustaining large peak currents. For example, transistors capable of +/−250V may be used.

Figure 9:
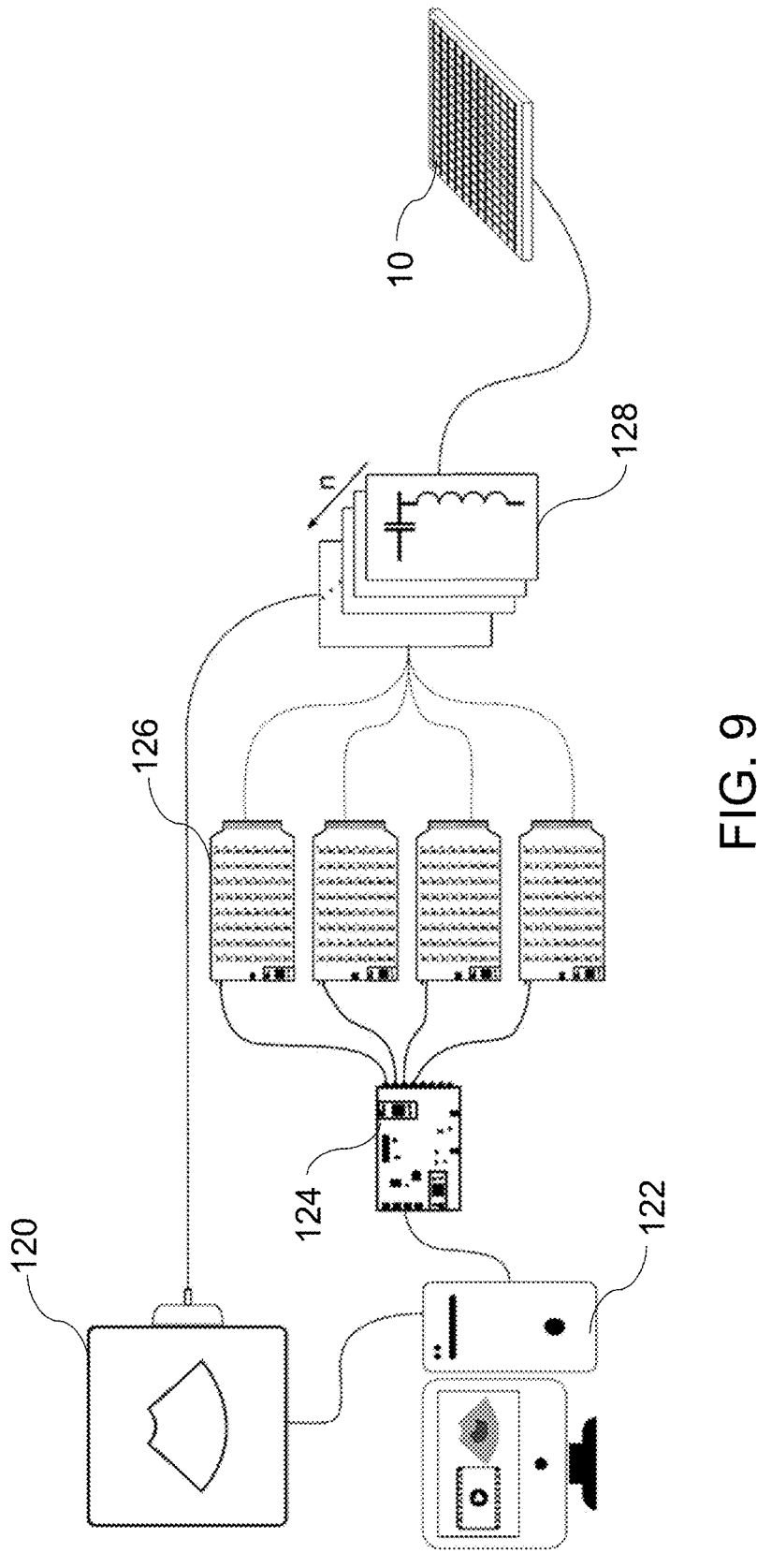
FIG. 9 is a block diagram of an electronic circuit used to drive an ultrasonic transducer.
Figure 16:
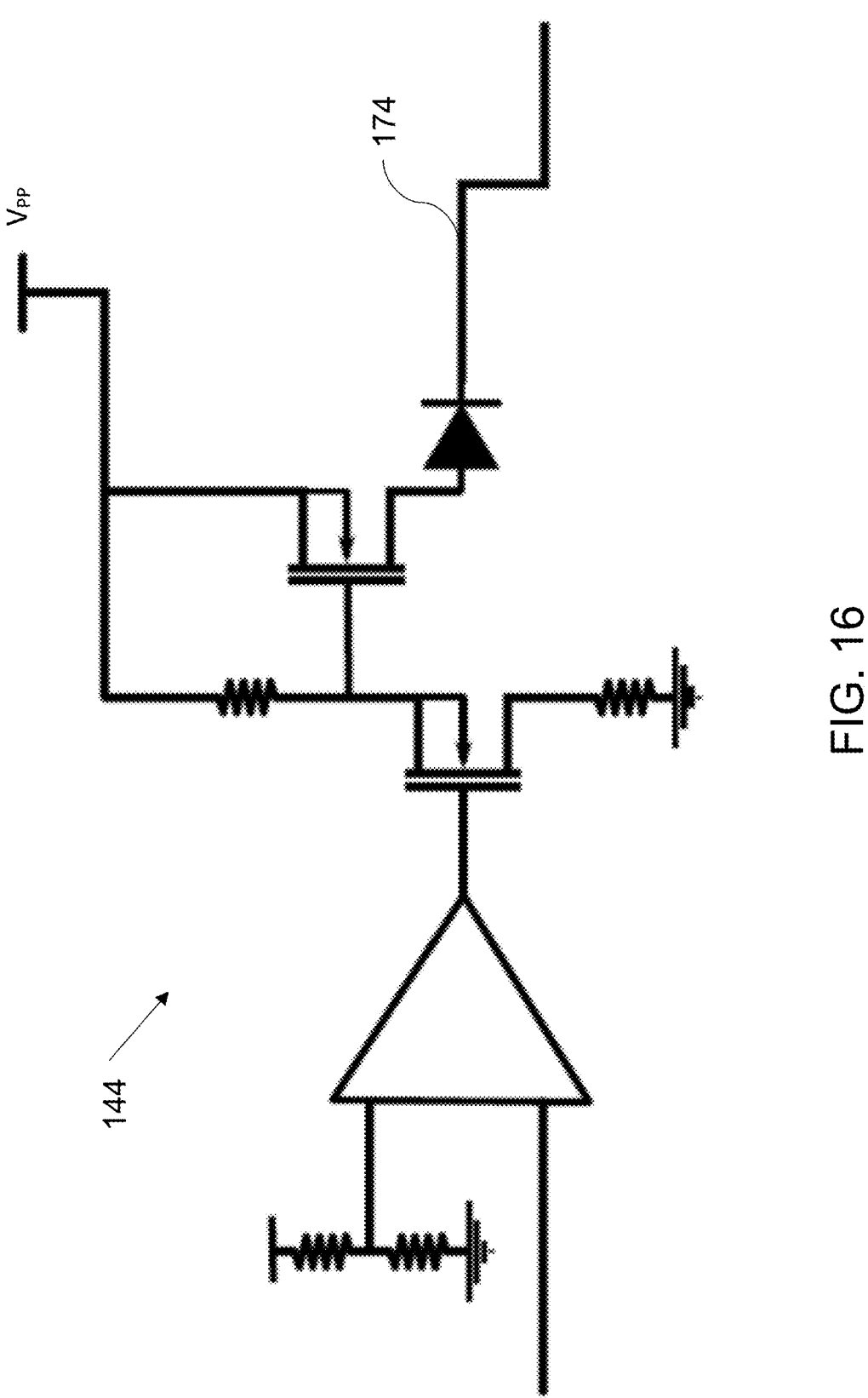
FIG. 16 is a circuit diagram of a VPP switching block.

Referring to FIG. 9, an example of a design intended to prevent high voltage transmit signals from scrambling sensitive digital control electronics and to prevent a danger of combined voltages shorting to create unwanted dangerous currents. The depicted controller shows a single high-voltage high-speed switching channel. The design may include paired control signals and a 2 to 4 decoder, such that a simultaneous high voltage and low voltage (or ground) output state would never be combined at the output stage of a high-voltage switching channel. A high impedance state may occur when none of the VPP, GND or VNN are activated to deactivate potentially shorted array elements. A block diagram of a switching block with a circuit with a positive high voltage VPP output 170 is shown in FIG. 16. Without this high impedance state, a high positive bias voltage on one channel and a large negative bias voltage on an adjacent shorted channel may lead to sustained large currents which could damage the electronics.

Figure 10:
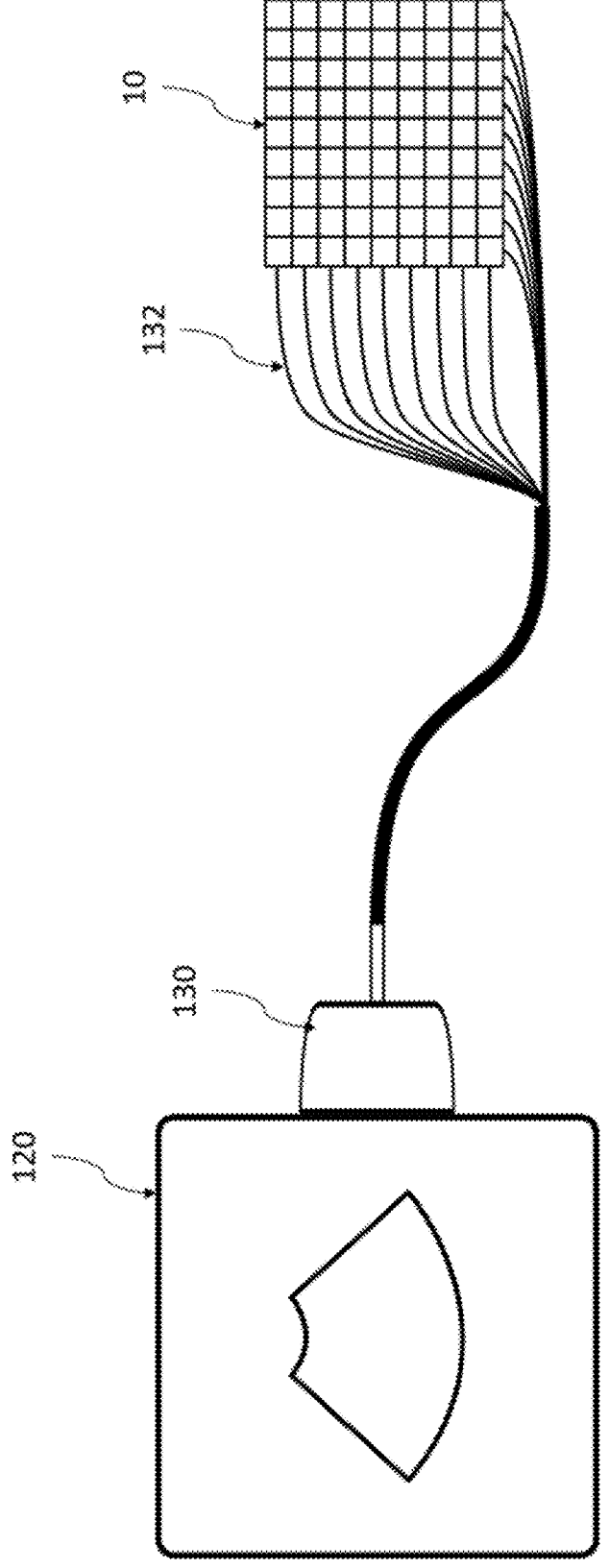
FIG. 10-15 are block diagrams of examples of ultrasonic imaging systems.
Figure 13:
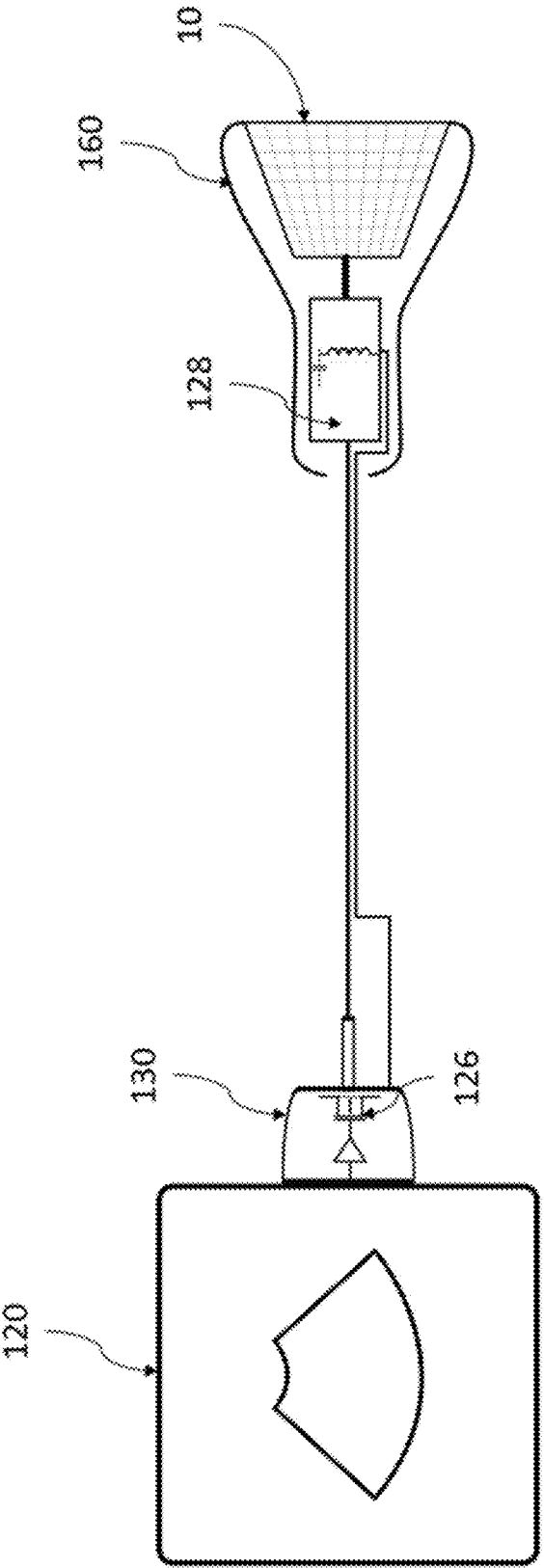
Figure 14:
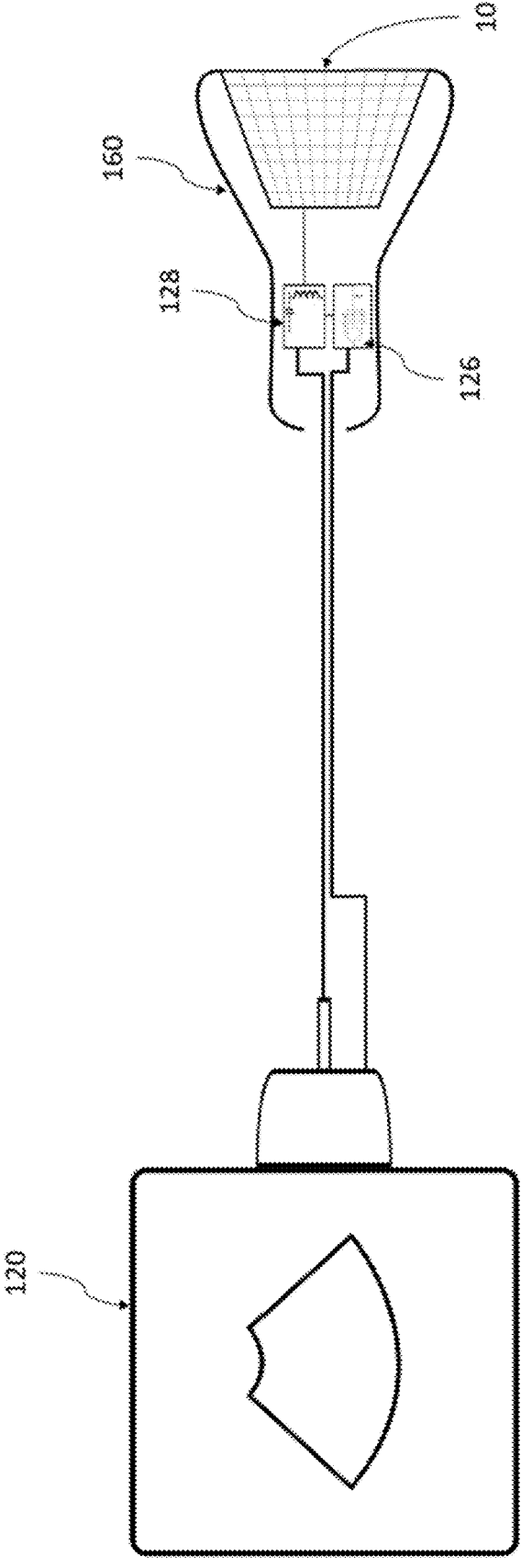
Figure 15:
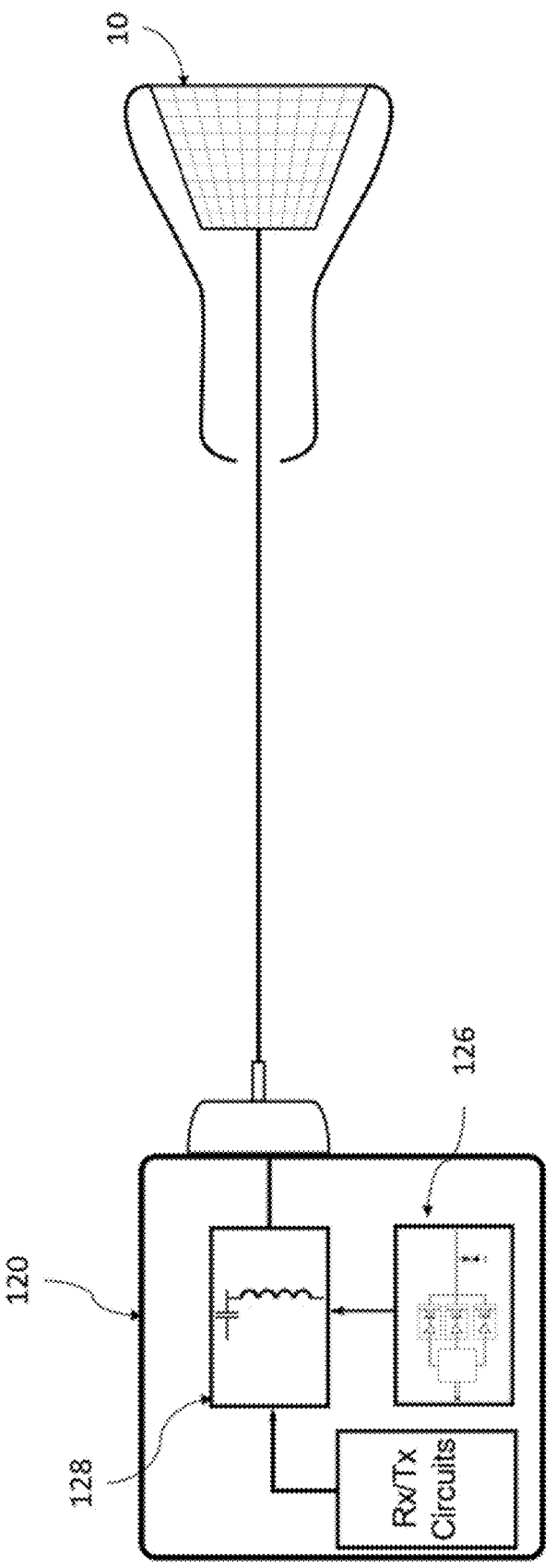

The example shown in FIG. 9 includes a Verasonics Vantage Research ultrasound system 120 (containing pulsing-receiving electronics and data acquisition hardware and software), a computer 122 for streaming data to using PCIe 3.0, a central control unit 124 (CCU) for programming high voltage switching electronics 126 (contained on pi-Cards), bias tees 128 for combining RF transmit-receive signals and high-voltage biasing voltages, all connected to a bias-switchable row-column array 10. Referring to FIG. 10, the electronics may be connected to each row and each column of array 10 by a connector 130 which has a cable 132 connected to each row and column of array 10. In other embodiments, bias-switching electronics 126 and bias tees 128 may either be located together in a transducer head 160 (as shown in FIG. 13), in the connector 130 that connects to ultrasound system 120 (as shown in FIGS. 13 and 14), integrated partially in the transducer head or partially in the connector, or all in the ultrasound system 120 (as shown in FIG. 15). The bias tees 128 may use shunt resistors instead of shunt inductors, or a combination of the two.

In one example, referring to FIG. 10, connector 130 between ultrasound system 120 and array 10 may house high-voltage bias-switching electronics 126 and bias tees 128.

Figure 11:
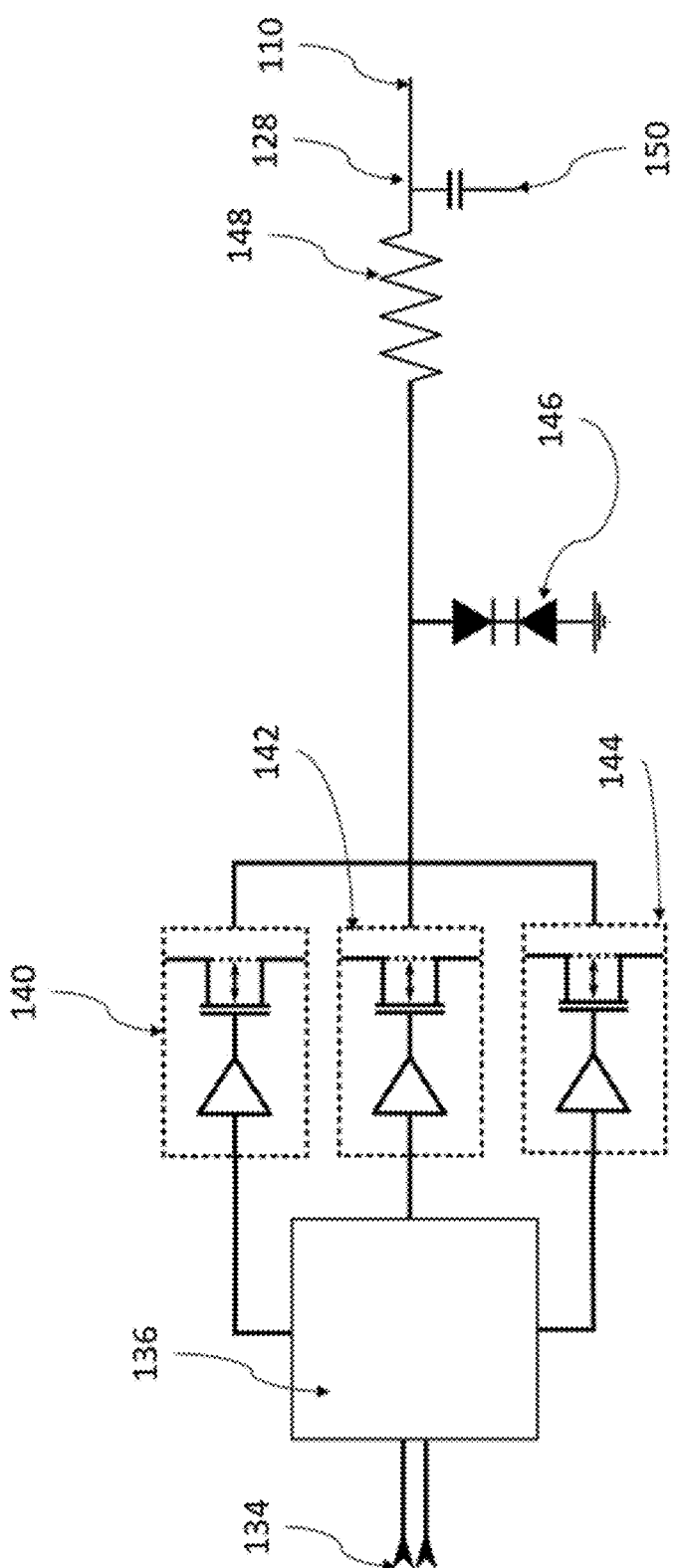

Referring to FIG. 11, a block diagram of the bias-switching electronics 126 is shown, with bias tees 128 and transmit-receive (Tx/Rx) electronics for one channel, connected to a row or column of bias-switchable row-column array 10. Bias switching electronics 126 may include digital control lines 134 to select the biasing state connected to a 2-to-4 decoder 136, a positive high voltage block 140, a ground block 142, and a negative high voltage block 144. The blocks 140, 142, and 144 output to the bias tee 128, which may include back-to-back diodes 146 connected to ground for high impedance state, bias tee resistor 148, and a bias tee capacitor 150 connected to cable 132 for connection to a row or column.

Figure 12:
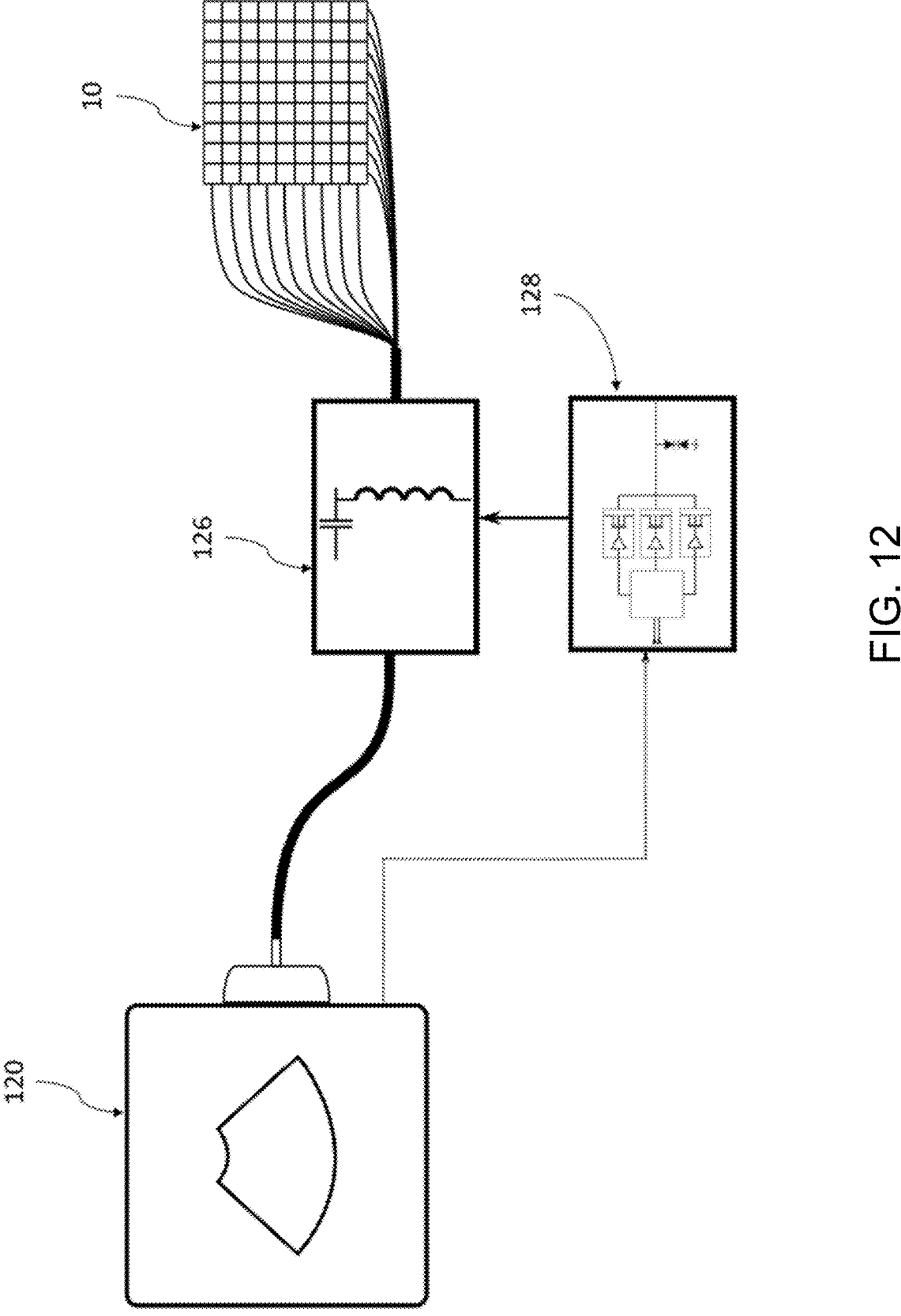

Referring to FIG. 12, another embodiment is shown in which bias-switching electronics 126 and bias tees 128 are separate modules connected between an ultrasound system 120 and a bias-switchable row-column array 10.

Referring to FIG. 13, a further embodiment is shown where bias tees 128 are housed in an ultrasound probe 160 that includes array 10, but bias-switching electronics 126 are housed in the connector 130 that plugs into an ultrasound system 120.

Referring to FIG. 14, there is shown a further embodiment, where bias switching electronics 126 and bias tees 128 are housed in ultrasound probe 160.

Referring to FIG. 15, a further embodiment is shown where the bias-switching electronics 126 and bias tees 128 are housed within ultrasound system 120 and the bias-switchable row-column array 10 connects to it.

Figure 17:
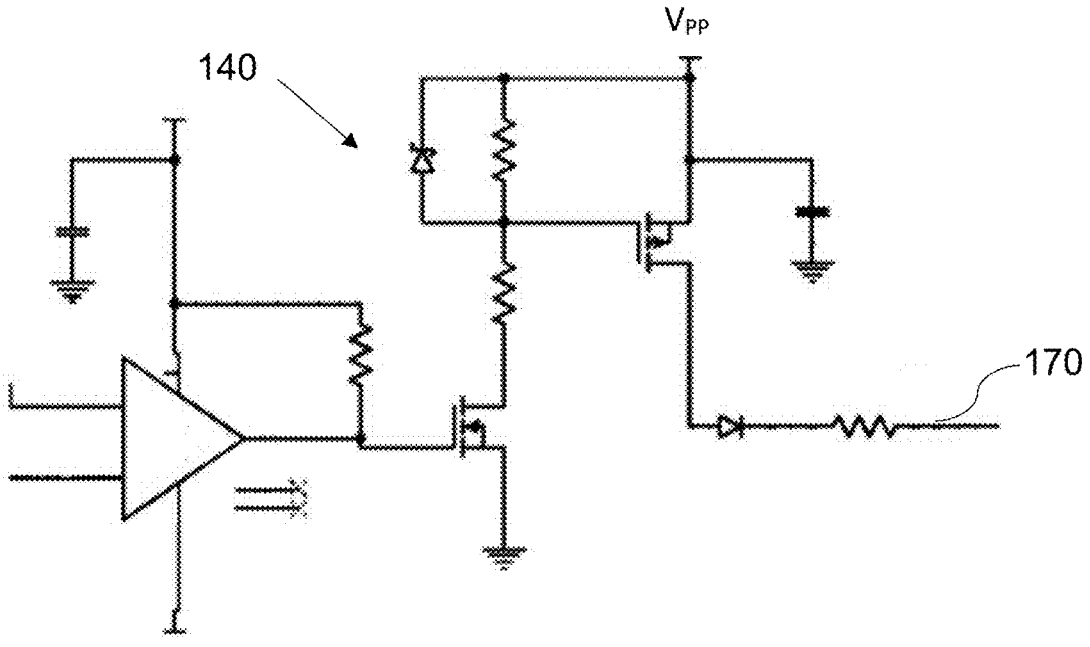
FIG. 17 is a circuit diagram of a alternate example of a VPP switching block
Figure 18:
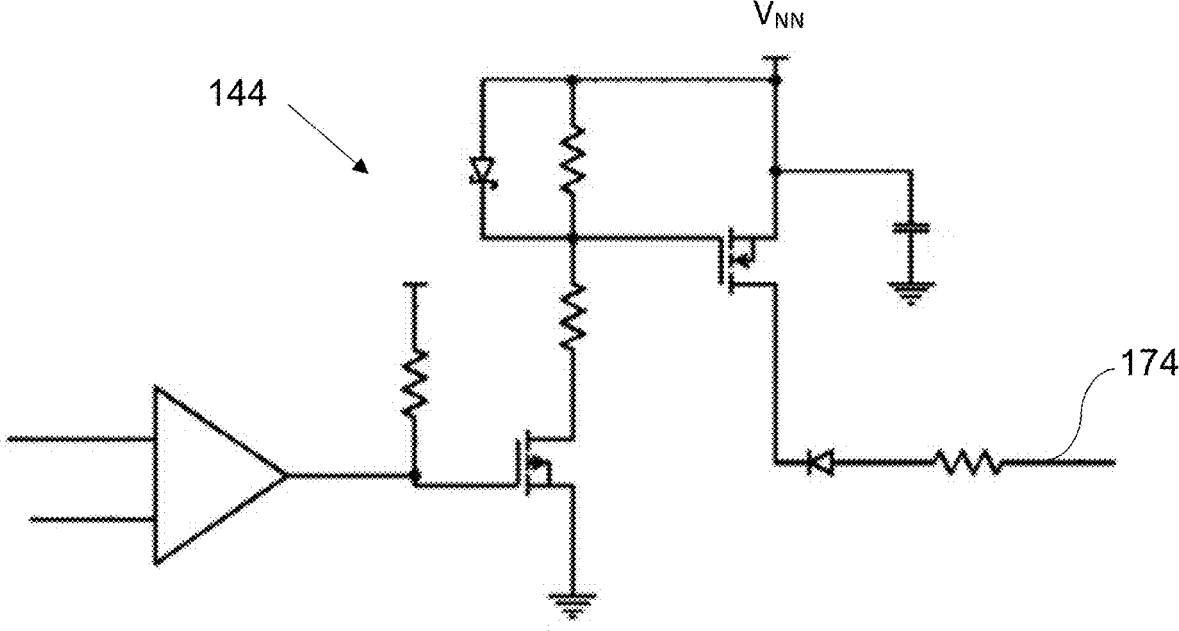
FIG. 18 is a circuit diagram of a VNN switching block.
Figure 19:
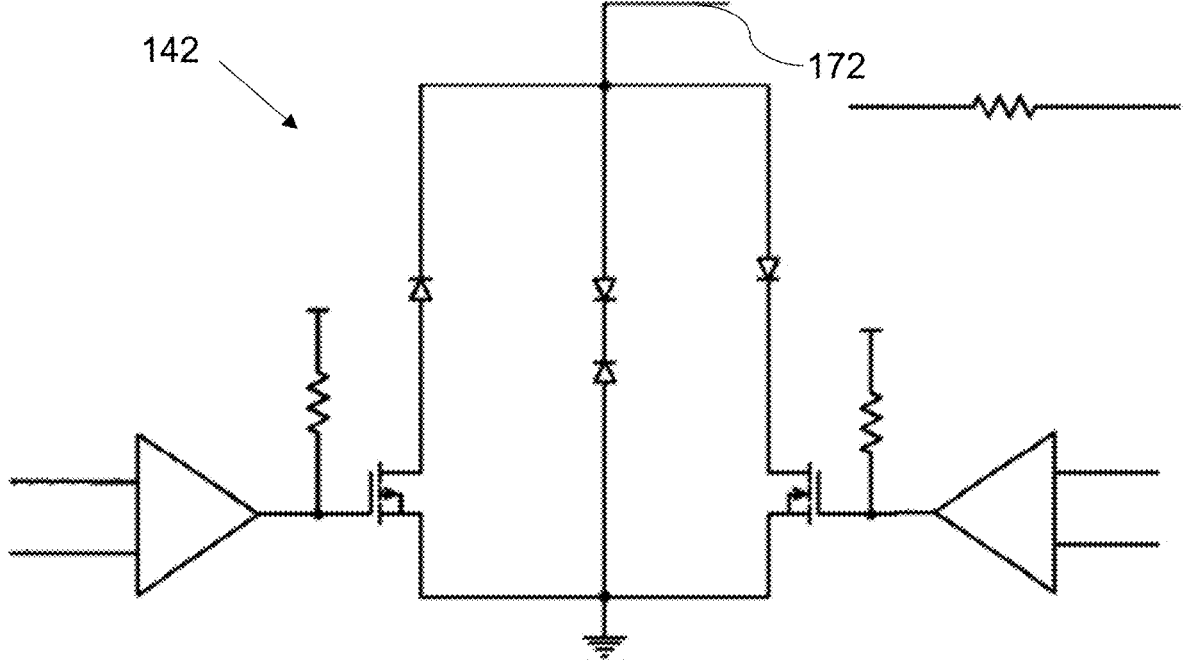
FIG. 19 is a circuit diagram of a ground switching block.

FIG. 17 through FIG. 19 depict examples of high-voltage switching electronics 126 using a modified MOSFET-based H-bridge driving circuit, where FIG. 17 depicts a circuit 140 with a +VPP output 170, which may be used as positive high voltage block 140, FIG. 18 depicts a circuit 144 with a −VNN output 174, which may be used as negative high voltage block 140, and FIG. 19 depicts a circuit with a ground output 172, which may be used as ground block 142. For each of the aforementioned examples of high-voltage switching electronics, a high-impedance state is possible, and VPP and VNN can be as high as 500V in magnitude with high-voltage MOSFET transistors.

Results/Discussion

In one example, a 64×64 TOBE array without a matching layer showed a center frequency of 7.3 MHz with a fractional BW of 66%. A matching layer with a grounded middle conductive layer further improved it to 9.7 MHz at 103% BW. The effect of the coupling current was simulated on a 128×128 TOBE array with a switching DC bias of +/−200 volts at a repetition rate of 10 kHz. The maximum simulated AC leakage current through a patient's body was reduced from ~4.5 mA to ~40 nA for a single and triple layer of matching layers, respectively. Additionally, edge-wave artifacts were reduced by ~13 dB in imaging simulations.

In another example, a 256-channel fast bias switching module was designed and fabricated using modified H-bridge MOSFET drivers as shown in FIG. 18. The MOSFETs were capable of +/−500V operation. The module was designed to interface an electrostrictive 128×128 row-column array with a typical commercial ultrasound system capable of channel data acquisition. The module was interfaced to a Verasonics Vantage 256 ultrasound platform & implemented ultrafast orthogonal row-column electronic scanning (FORCES) & Hadamard-encoded readout of every element for plane-wave and photoacoustic imaging.

Without a system load, the high voltage switching module was able to switch between high voltage states in less than 10 ms. With the ultrasound system connected, fast switching at up to +/−250V may be achieved in 200 ms, enabling bias switching every transmit event at up to 5 KHz pulse-repetition rates. With this module interfacing to a bias-tee transducer interface board, cross-pane and volume image acquisition of phantoms and tissues at ultrafast imaging rates was demonstrated. The developed module may be used for ultrafast volumetric ultrasound with high image quality and resolution.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings but should be given the broadest interpretation consistent with the description as a whole.

What is claimed is:

1. An ultrasonic transducer system comprising:
a bias-switchable, ultrasonic transducer array comprising:
   a bias-sensitive ultrasonic layer having a top surface and a bottom surface;
   top electrode strips in electrical contact with the top surface of the bias-sensitive ultrasonic layer; and
   bottom electrode strips in electrical contact with the bottom of the bias-sensitive ultrasonic layer, the bottom electrode strips being oriented at a non-zero angle relative to the top electrode strips; and
a bipolar voltage source connected to each of the top electrode strips and each of the bottom electrode strips to induce a polarization in the dielectric layer, the bipolar voltage source comprising:
   solid state transistors capable of switching between voltage states that comprise a high bias voltage and a low bias voltage that differ by 25V or more and at a switching speed of less than 1 millisecond, the solid state transistors being capable of withstanding at least 20 mA of peak current; and
   bias switching electronics that comprise a digital decoder, the digital decoder being adapted to control the voltage states of the solid state transistors based on digital control signals, and to prevent different bias voltages being output simultaneously from one or more of the solid state transistors.

2. The ultrasonic imaging system of claim 1, further comprising a leakage-current mitigation layer.

3. The ultrasonic imaging system of claim 2, wherein the leakage-current mitigation layer comprises:
an electrically-conductive shielding layer that is electrically isolated from the top electrodes and electrically connected to an external electrical potential; or
a dielectric isolation layer having a thickness sufficient to minimize leakage currents from at least 5 mA to at least 1 mA or less.

4. The ultrasonic transducer system of claim 3, wherein the electrically-conductive shielding layer is maintained at a ground potential or a potential of a subject being imaged.

5. The ultrasonic transducer system of claim 3, further comprising an additional electrically insulating layer adjacent to the electrically-conductive shielding layer.

6. The ultrasonic transducer system of claim 3, wherein the electrically-conductive shielding layer comprises an acoustical matching layer, or is less than a quarter of an acoustic wavelength associated with a center operating frequency.

7. The ultrasonic transducer system of claim 1, wherein the bias-sensitive ultrasonic layer is a CMUT layer or a dielectric material or composite dielectric material, wherein the dielectric material or composite dielectric material comprises an electrostrictive material, a ferroelectric material, a relaxor ferroelectric material, a weak ferroelectric material, a non-ferroelectric material, or combinations thereof.

8. The ultrasonic transducer system of claim 1, wherein the array comprises physical apodization such that a transmit and receive sensitivity of the array is weaker near an outer perimeter of the array compared to a center.

9. The ultrasonic transducer system of claim 8, wherein the physical apodization is implemented by:

tapering the top electrode strips, the bottom electrode strips or both the top electrode strips and the bottom electrode strips to have reduced surface area near the edge of the array; or lowering the fraction of high-dielectric constant material near the edge of the array.

10. The ultrasonic transducer system of claim 1, wherein the array is integrated into a wearable form factor, a form factor that is mountable on a subject, a handheld probe, or an endoscopic or laparoscopic form factor for imaging inside the subject.

11. The ultrasonic transducer system of claim 1, wherein the ultrasonic transducer array is in a planar, spherical concave, spherical convex, plano-concave, or plano-convex shape.

12. The ultrasonic transducer system of claim 1, further comprising voltage protected pre-amplifiers in a probe.

13. The ultrasonic transducer system of claim 1, further comprising a multiplexer that connects a plurality of channels of pulsing/receiving electronics and biasing electronics to a plurality of top electrode strips, bottom electrode strips, or both top electrode strips and bottom electrode strips, via a switch array.

14. The ultrasonic transducer system of claim 13, wherein the biasing electronics are coupled to the ultrasonic transducer array and the pulsing/receiving electronics.

15. The ultrasonic transducer system of claim 13, wherein the pulsing/receiving electronics and bias-switching electronics are combined into a single circuit based on multiple voltage-state solid-state electronics.

16. The ultrasonic transducer system of claim 13, wherein the biasing electronics are coupled to the switch array and to the pulsing/receiving electronics by means of a bias tee.

17. The ultrasonic transducer system claim 13, where the biasing electronics and pulsing electronics of the pulsing/receiving electronics are coupled to the top or bottom electrode strips and where receiving electronics of the pulsing/receiving electronics are coupled to the other of the bottom or top electrode strips.

18. The ultrasonic transducer system of claim 13, further comprising electrical matching networks to improve impedance matching between the ultrasonic transducer array and the pulsing-receiving electronics.

19. The ultrasonic transducer system of claim 13, wherein the bias-switching electronics are located in the housing of a connector to connect the cable-bundle-tethered array to an imaging system.

20. The ultrasonic transducer system of claim 1, wherein the switching speed between voltage states is less than a pulse-repetition interval of the pulsing electronics.

21. The ultrasonic transducer system of claim 1 wherein the bipolar voltage source comprises a positive voltage state, a negative voltage state, and a ground state.

22. The ultrasonic transducer system of claim 1, wherein the bipolar voltage source comprises a high-impedance state where the resistance is 100 KOhms or more.

23. The ultrasonic transducer system of claim 1, wherein the high bias voltage and the low bias voltage differ by 100V or more.

24. The ultrasonic transducer system of claim 23, wherein the bipolar voltage source switches between the high bias voltage and the low bias voltage immediately after a transmit event and prior to recording echo signals.

25. The ultrasonic transducer system of claim 1 wherein a maximum tolerated voltage magnitude of the ultrasonic transducer array is greater than a sum of a transmit pulse magnitude and a maximum bias voltage magnitude.

26. The ultrasonic transducer system of claim 1 wherein the bipolar voltage source comprises differential inputs.

27. The ultrasonic transducer system of claim 1 wherein the bipolar voltage source is connected to a 2-to-4 decoder that defines the voltage state.

28. The ultrasonic transducer system of claim 1 wherein the bipolar voltage source is capable of 100V switching or greater.

29. The ultrasonic transducer system of claim 1 wherein the bipolar voltage source comprises transistors that are capable of withstanding 1A peak current or more.

30. The ultrasonic transducer system of claim 1 wherein the ultrasonic transducer array comprises one or more acoustic matching layers on the front side of the array and/or one or more acoustically absorbing backing layers on the back side of the array.

31. An ultrasonic imaging system, comprising:

a bias-switchable, ultrasonic transducer array comprising:

a bias-sensitive ultrasonic layer having a top surface and a bottom surface;

top electrode strips in electrical contact with the top surface of the bias-sensitive ultrasonic layer; and bottom electrode strips in electrical contact with the bottom of the bias-sensitive ultrasonic layer, the bottom electrode strips being oriented at a non-zero angle relative to the top electrode strips;

a bipolar voltage source connected to each of the top electrode strips and each of the bottom electrode strips to induce a polarization in the dielectric layer, the bipolar voltage source comprising:

solid state transistors capable of switching between a high bias voltage and a low bias voltage that differ by 25V or more at a switching speed of less than 1 ms, the solid state transistors being capable of withstanding at least 20 mA of peak current; and bias switching electronics that comprise a digital decoder, the digital decoder being adapted to control the voltage states of the solid state transistors based on digital control signals and to prevent different bias voltages being output simultaneously from one or more of the solid state transistors;

pulsing electronics and receiving electronics electrically connected to the ultrasonic transducer array;

a controller for controlling the bipolar voltage source, the pulsing electronics, and the receiving electronics; and an imaging system that generates an image of a sample based on signals received by the receiving electronics.

* * * * *